United States Patent
Go et al.

(10) Patent No.: US 12,063,090 B2
(45) Date of Patent: Aug. 13, 2024

(54) METHOD FOR TRANSMITTING PHYSICAL UPLINK SHARED CHANNEL IN WIRELESS COMMUNICATION SYSTEM, AND DEVICE FOR SAME

(71) Applicant: LG ELECTRONICS INC., Seoul (KR)

(72) Inventors: Seongwon Go, Seoul (KR); Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

(21) Appl. No.: 17/310,524

(22) PCT Filed: Feb. 10, 2020

(86) PCT No.: PCT/KR2020/001845
§ 371 (c)(1),
(2) Date: Aug. 6, 2021

(87) PCT Pub. No.: WO2020/162735
PCT Pub. Date: Aug. 13, 2020

(65) Prior Publication Data
US 2022/0166484 A1 May 26, 2022

(30) Foreign Application Priority Data
Feb. 8, 2019 (KR) .................. 10-2019-0015061

(51) Int. Cl.
*H04B 7/06* (2006.01)
*H04L 5/00* (2006.01)
(Continued)

(52) U.S. Cl.
CPC .......... *H04B 7/0695* (2013.01); *H04L 5/0051* (2013.01); *H04W 72/02* (2013.01); *H04W 72/046* (2013.01); *H04W 72/23* (2023.01)

(58) Field of Classification Search
CPC .... H04B 7/0695; H04W 72/23; H04W 72/02; H04W 72/046; H04L 5/051
See application file for complete search history.

(56) References Cited

U.S. PATENT DOCUMENTS

2019/0261338 A1* 8/2019 Akkarakaran ....... H04B 7/0619
2019/0349047 A1* 11/2019 Jayawardene ........ H04W 72/56
(Continued)

FOREIGN PATENT DOCUMENTS

| KR | 20180113138 | 10/2018 |
| WO | 2017192889 | 11/2017 |
| WO | 2018203728 | 11/2018 |

OTHER PUBLICATIONS

PCT International Application No. PCT/KR2020/001845, International Search Report dated May 27, 2020, 5 pages.
(Continued)

*Primary Examiner* — Kevin M Cunningham
(74) *Attorney, Agent, or Firm* — LEE, HONG, DEGERMAN, KANG & WAIMEY

(57) ABSTRACT

The present specification relates to a method which is for transmitting a Physical Uplink Shared Channel (PUSCH) in a wireless communication system, and is performed by a terminal. The method is characterized by including: a step for receiving, from a base station, information about a plurality of beam candidates for transmitting a PUSCH through a Sounding Reference Signal Resource Indicator (SRI) field or a Transmission Configuration Indicator (TCI) field of Downlink Control Information (DCI); a step for selecting any one beam among the plurality of beam can-
(Continued)

didates on the basis of a predefined criterion; and a step for transmitting the PUSCH by using the selected one beam.

14 Claims, 26 Drawing Sheets

(51) Int. Cl.
*H04W 72/02* (2009.01)
*H04W 72/044* (2023.01)
*H04W 72/23* (2023.01)

(56) References Cited

U.S. PATENT DOCUMENTS

2019/0394790 A1* 12/2019 Damnjanovic ..... H04L 27/0006
2020/0145062 A1* 5/2020 Jung ..................... H04W 48/20

OTHER PUBLICATIONS

Samsung., "Corrections on UL Beam Management," R1-1804362, 3GPP TSG RAN WG1 Meeting #92bis, Apr. 2018, 9 pages.
Samsung, "Enhancements on multi-beam operations," R1-1901378, 3GPP TSG RAN WG1 Ad-Hoc Meeting 1901, Jan. 2019, 11 pages.

* cited by examiner

[FIG. 1]
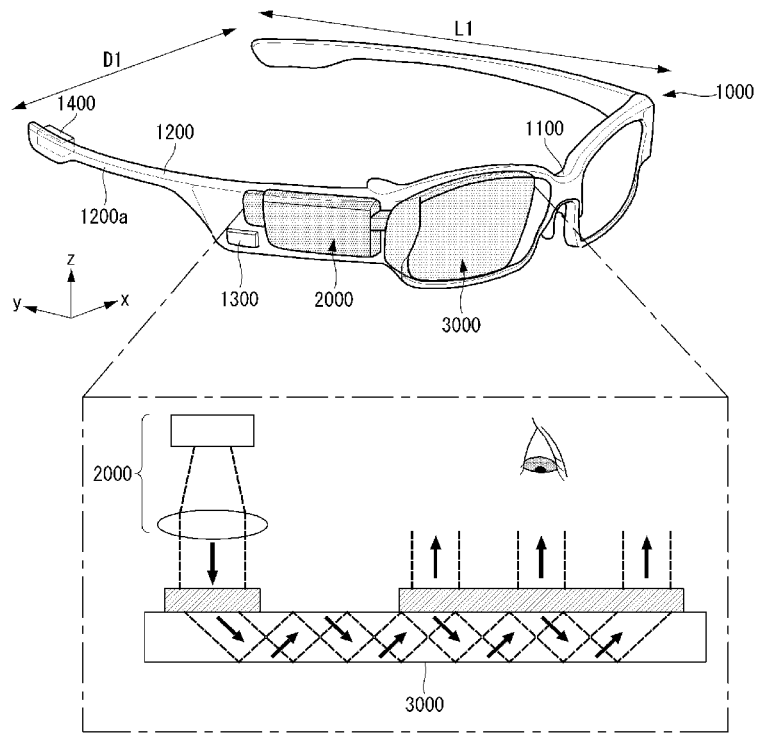
[FIG. 2]
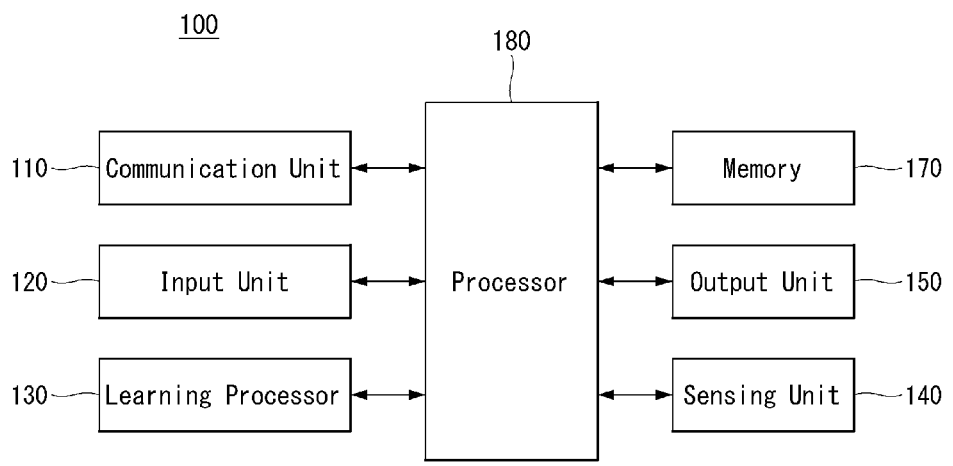

[FIG. 3]
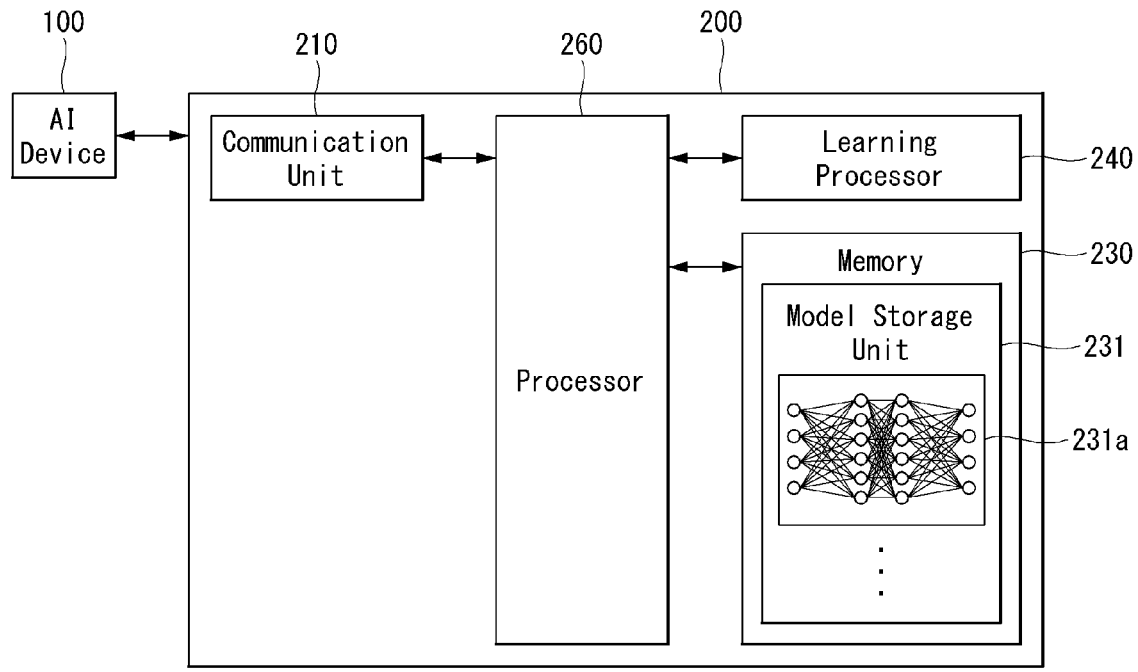
[FIG. 4]
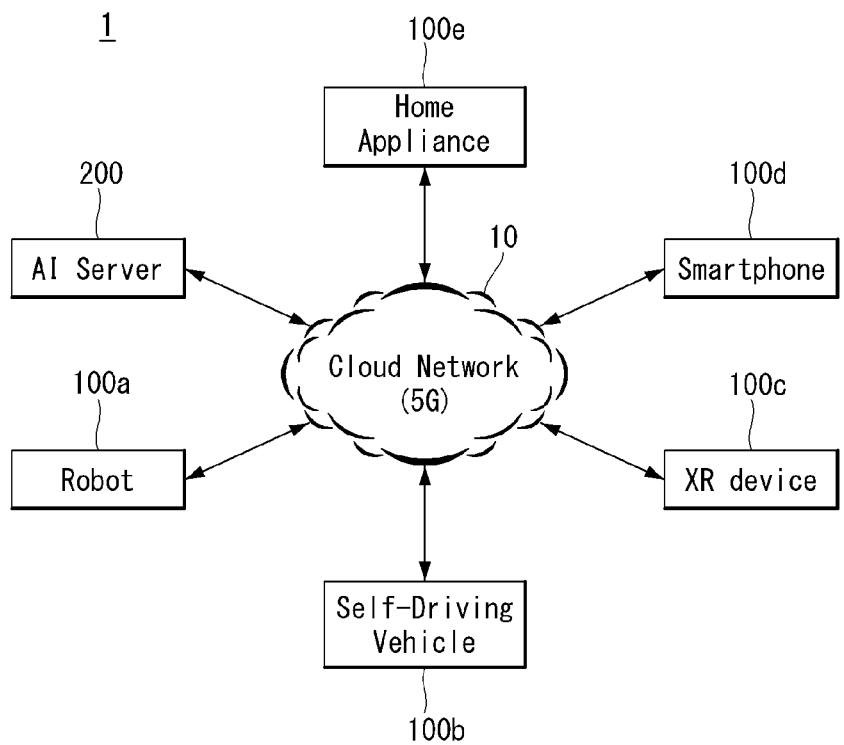

[FIG. 5]
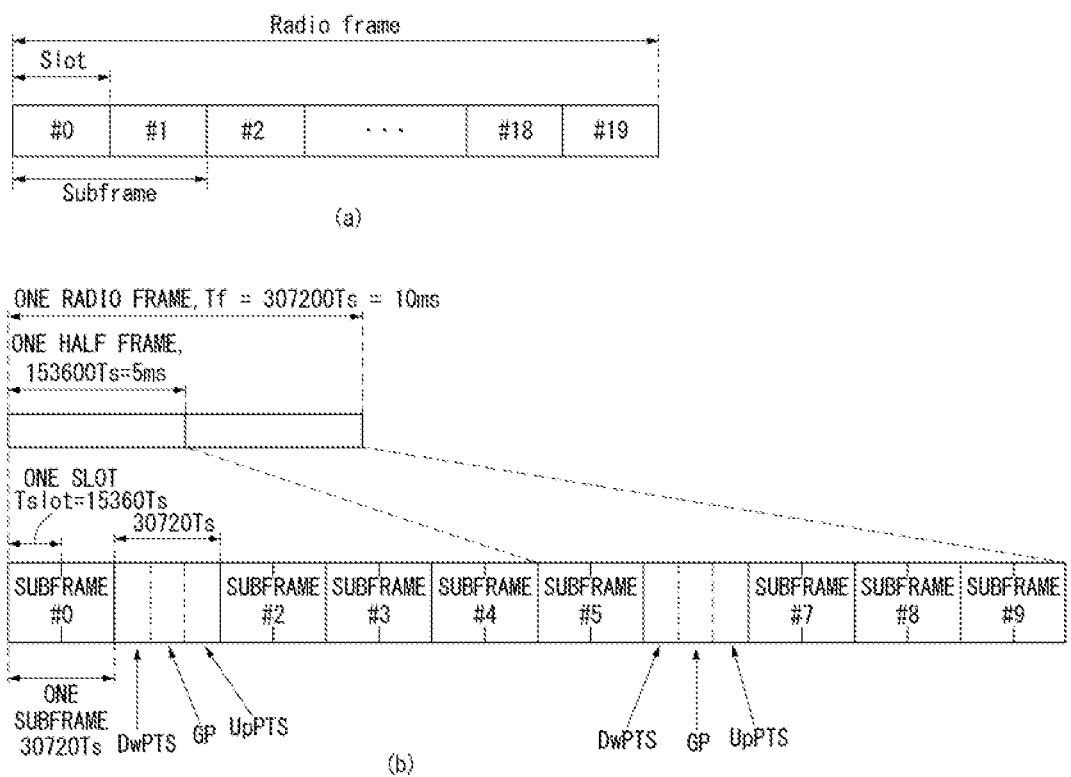

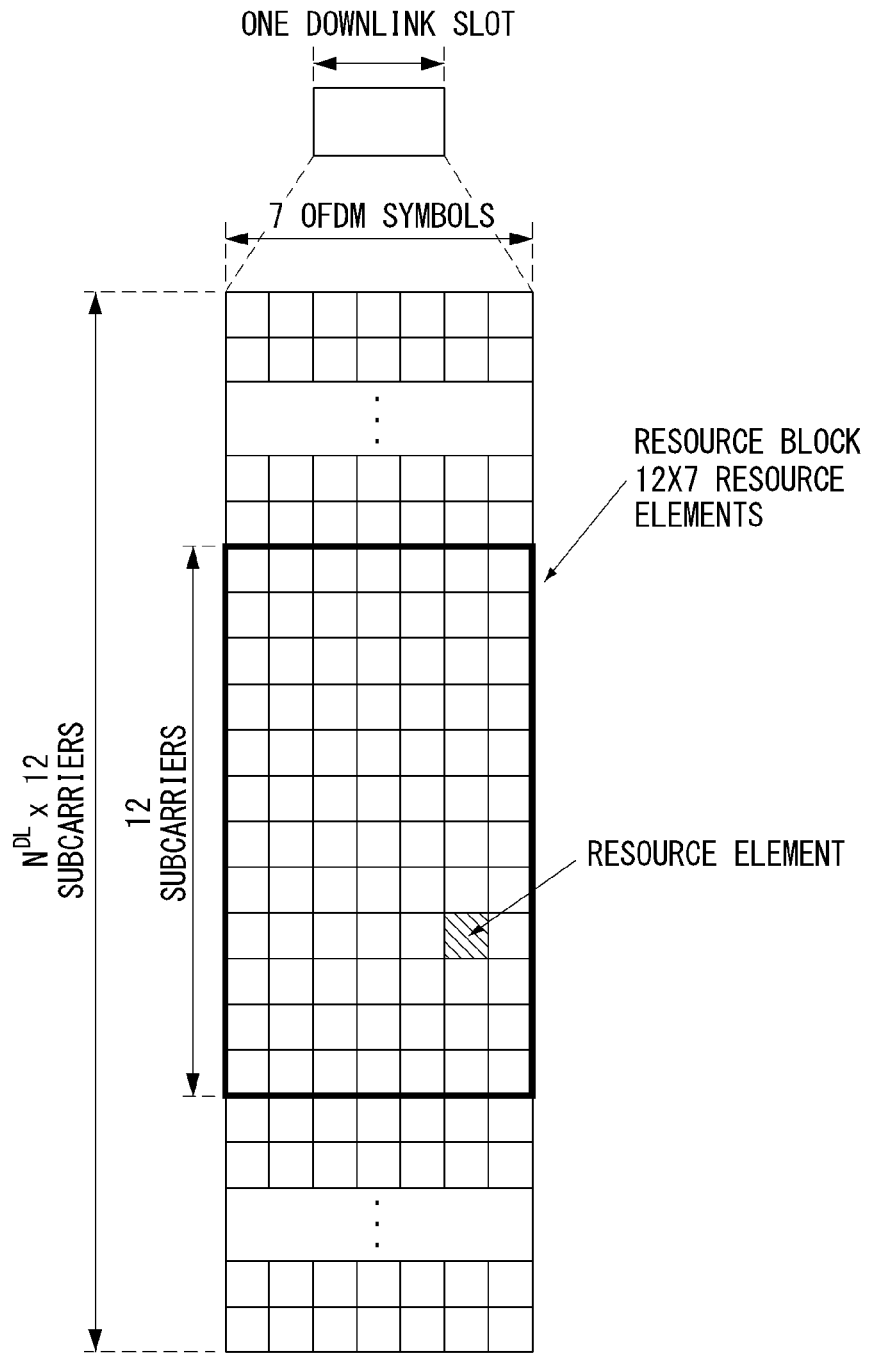
[FIG. 6]

[FIG. 7]
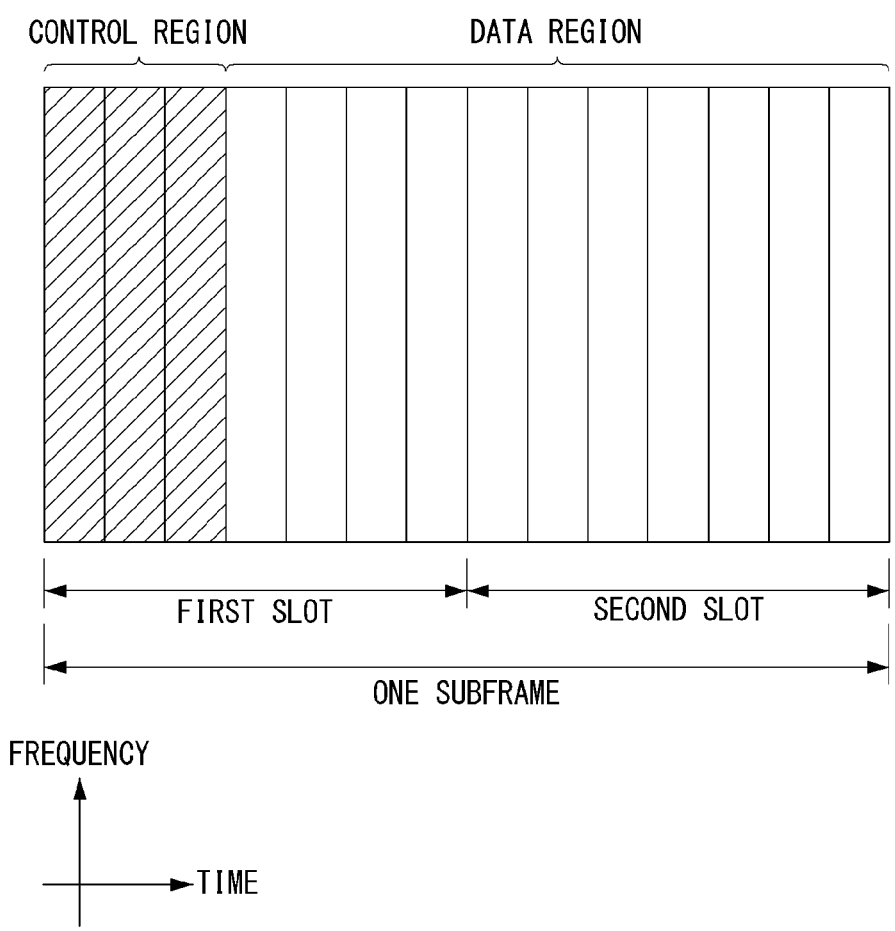

[FIG. 8]
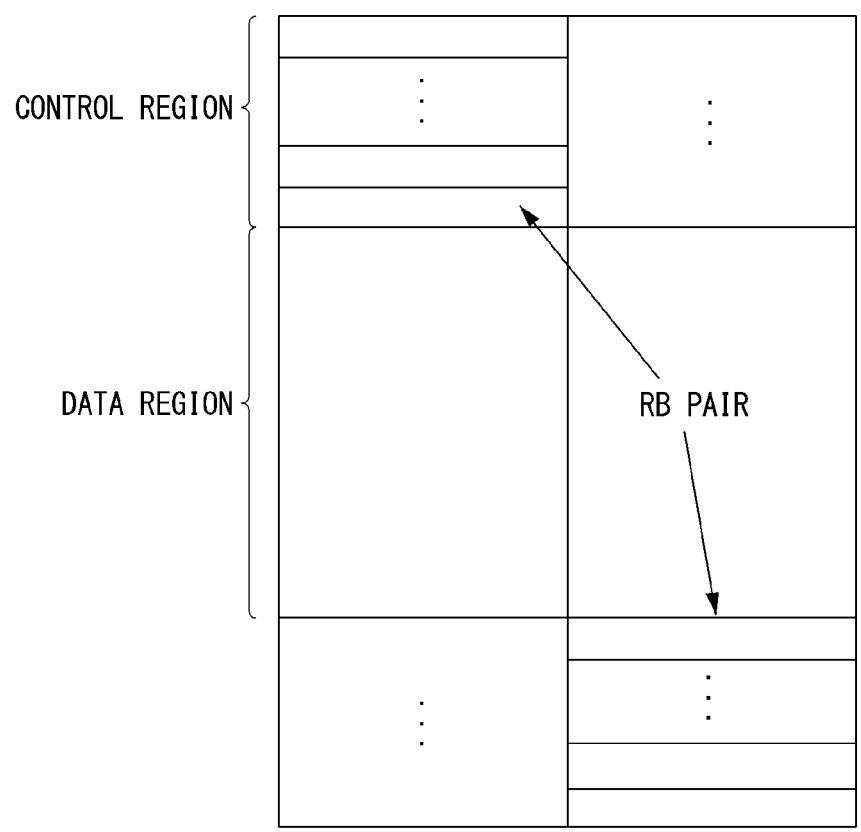

[FIG. 9]
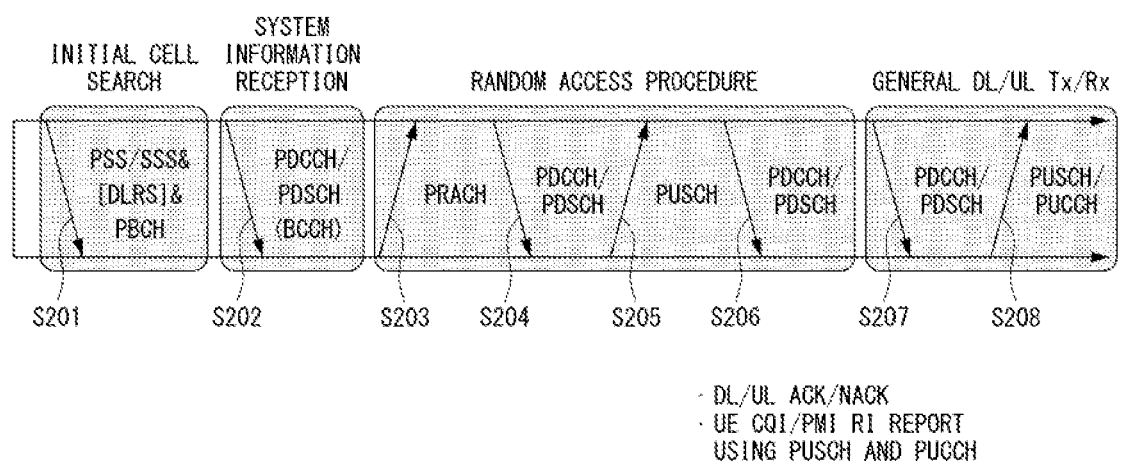
[FIG. 10]
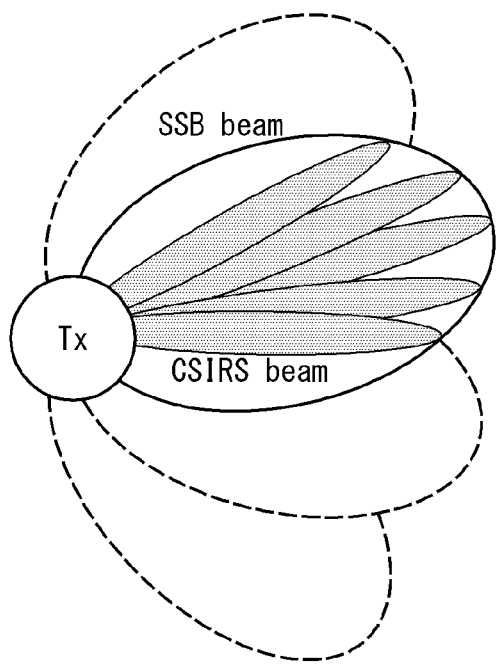

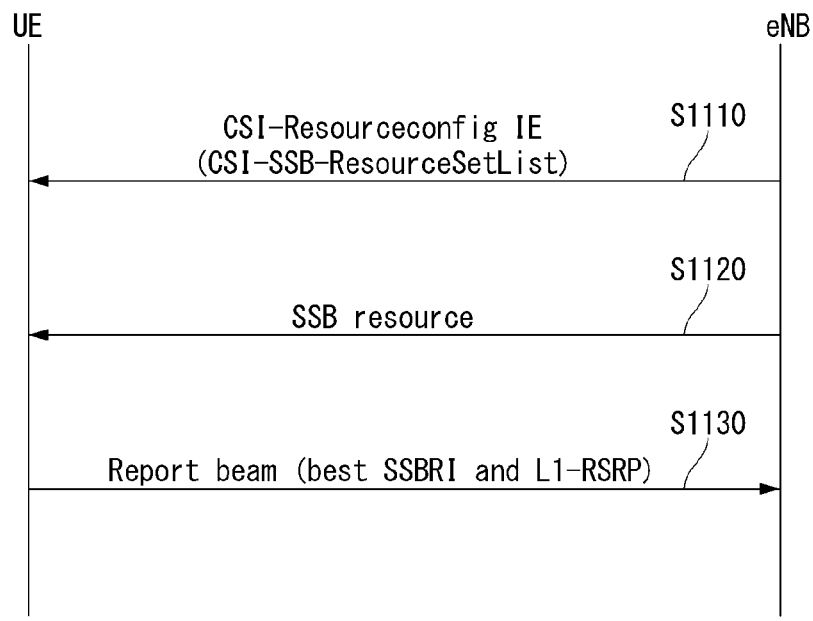
[FIG. 11]

[FIG. 12]
(a) 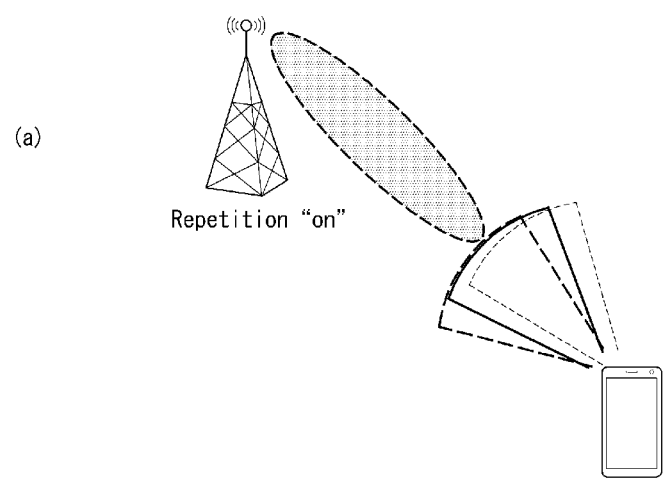
(b) 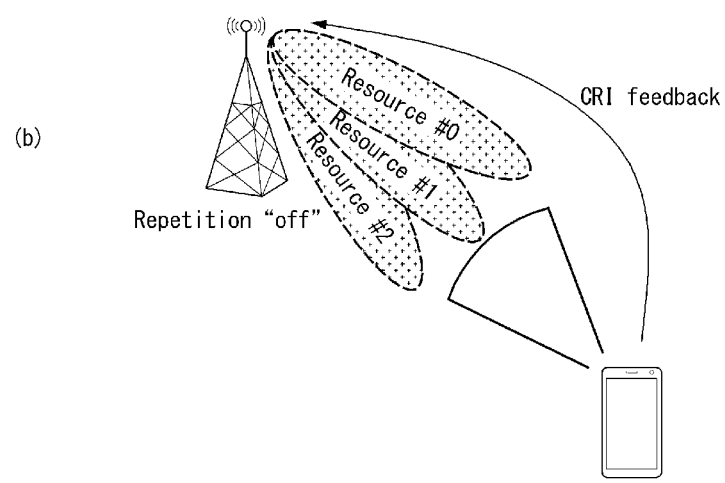

[FIG. 13]
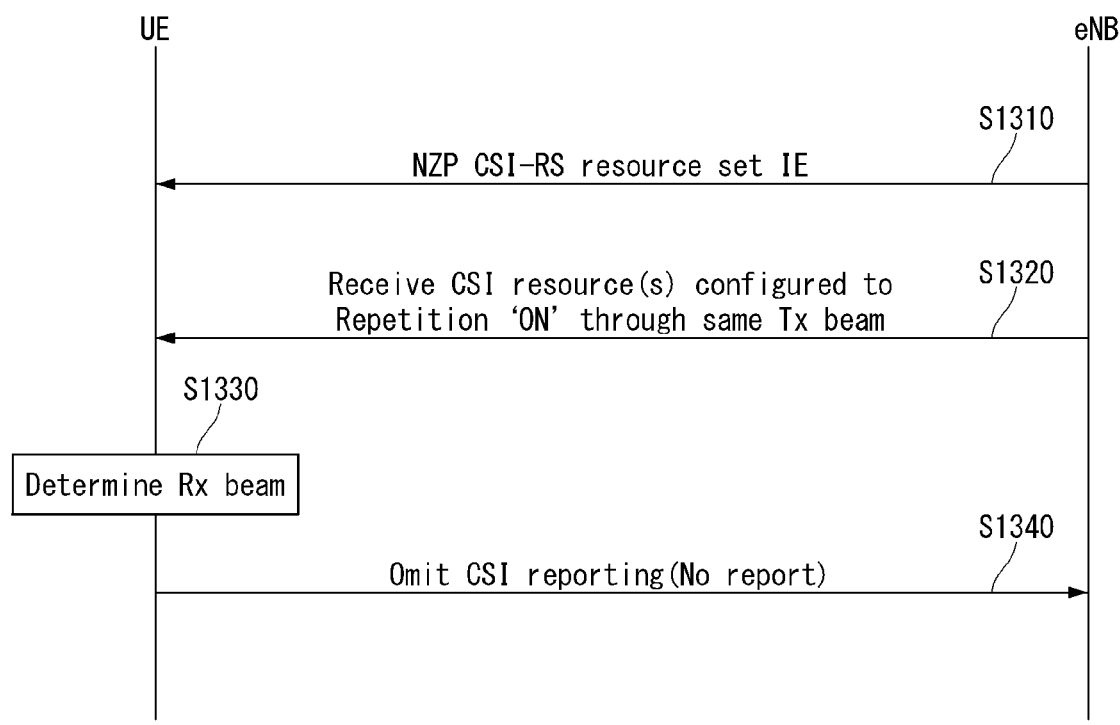

[FIG. 14]
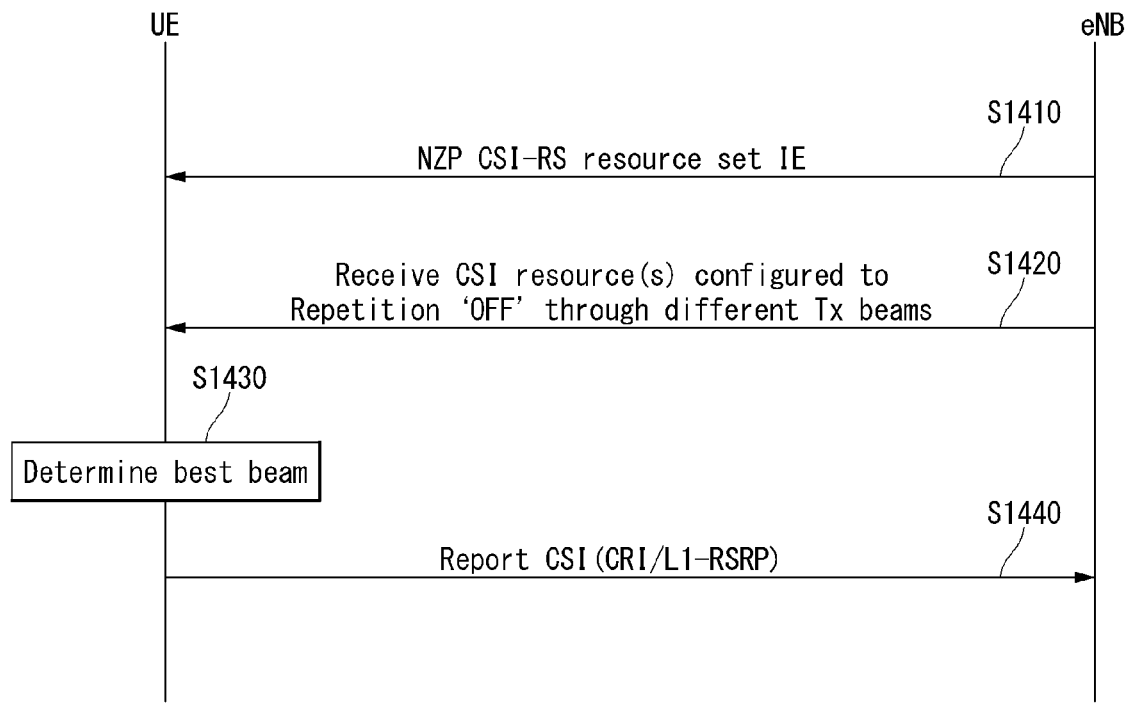
[FIG. 15]
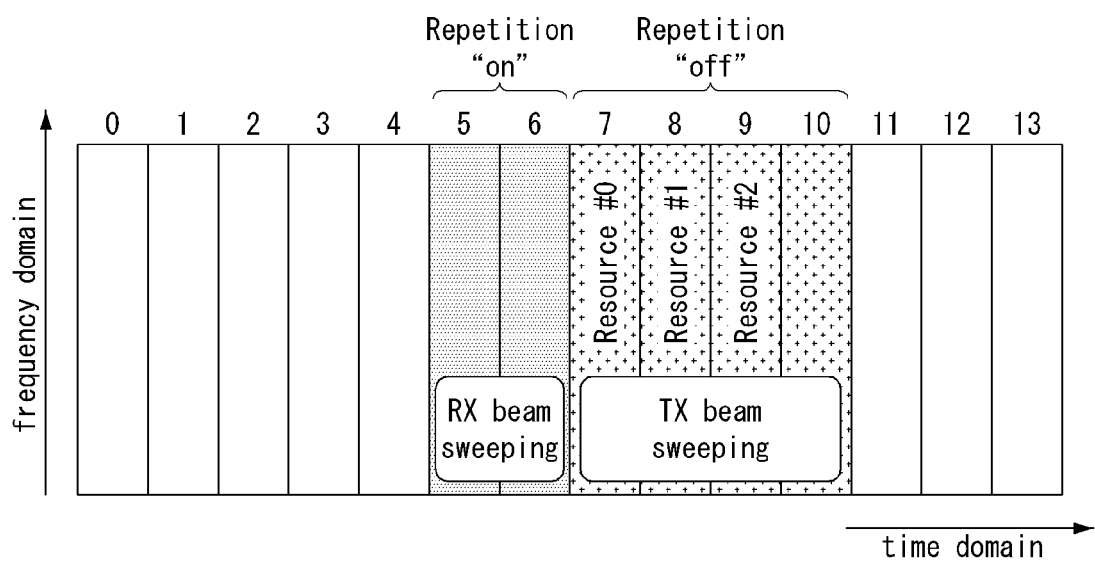

[FIG. 16]
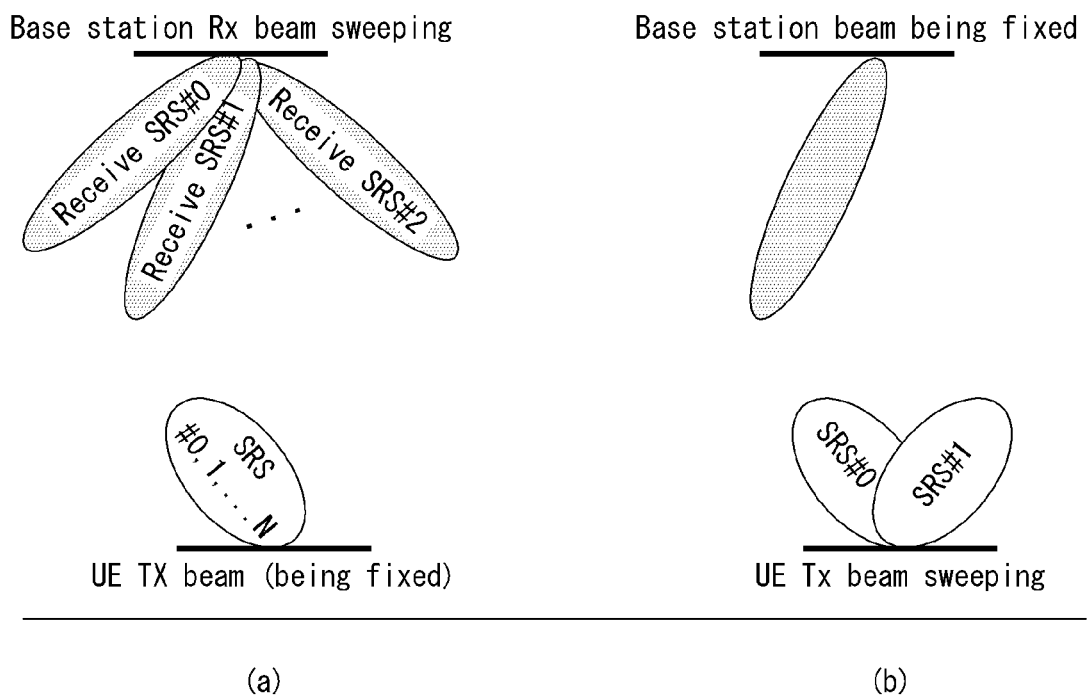

[FIG. 17]
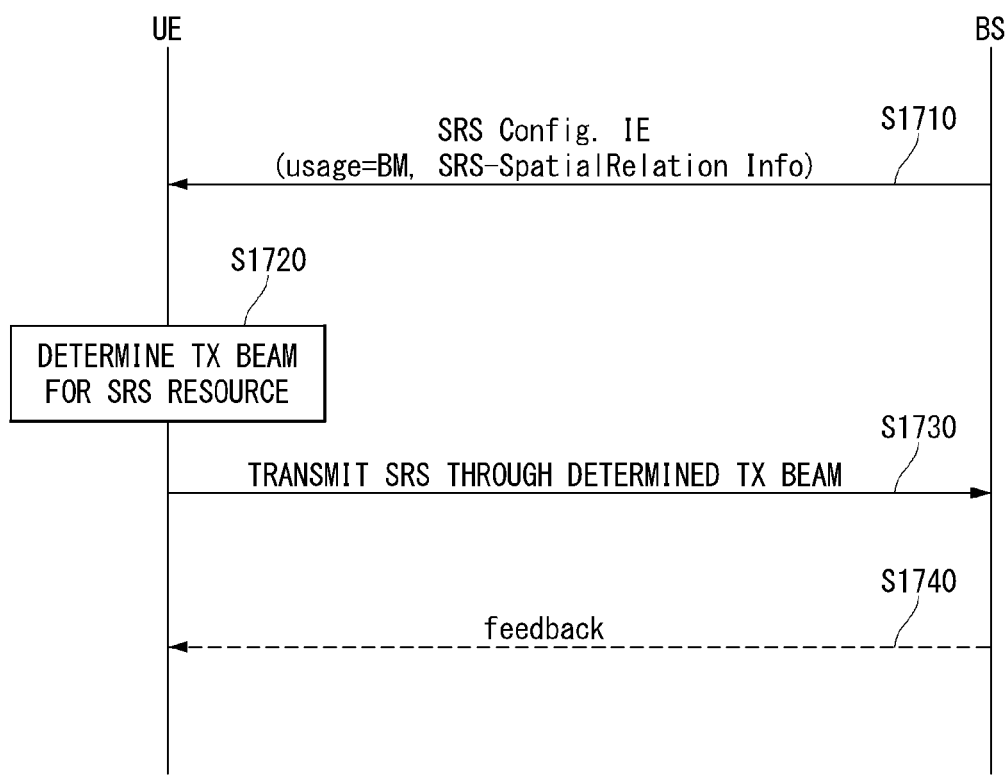

[FIG. 18]
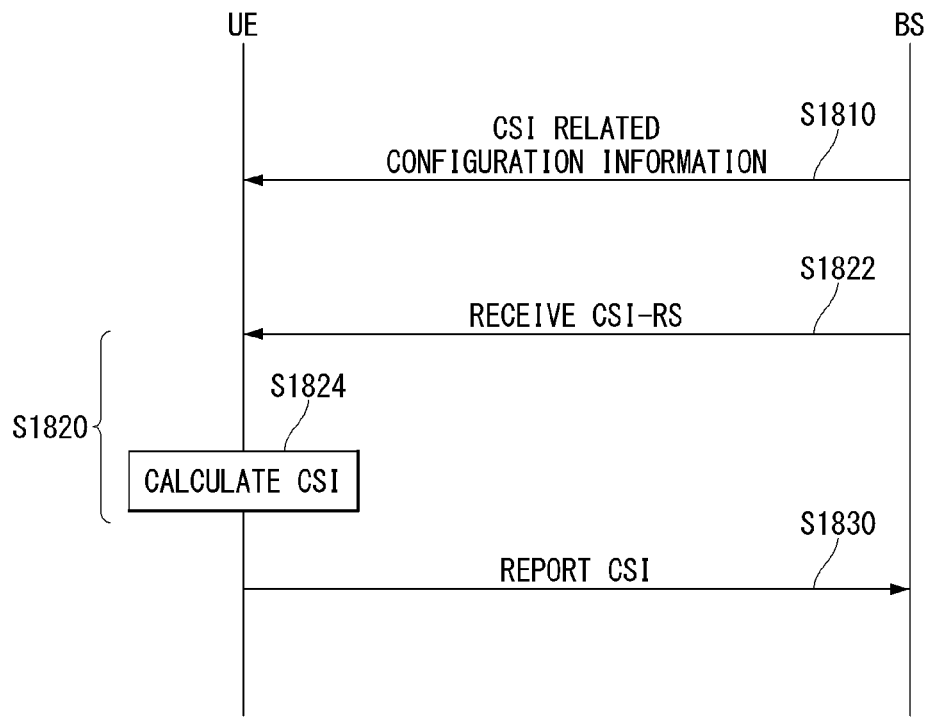
[FIG. 19]
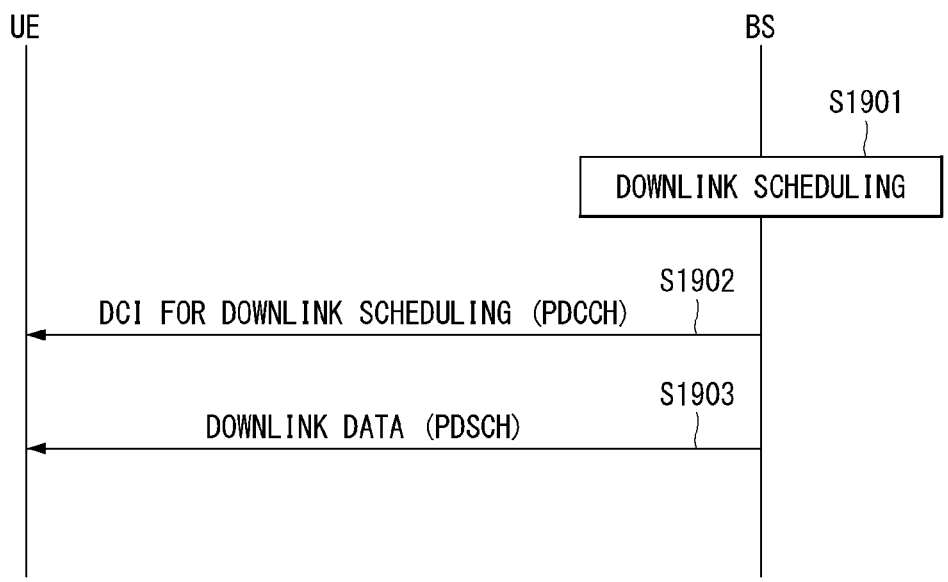

[FIG. 20]
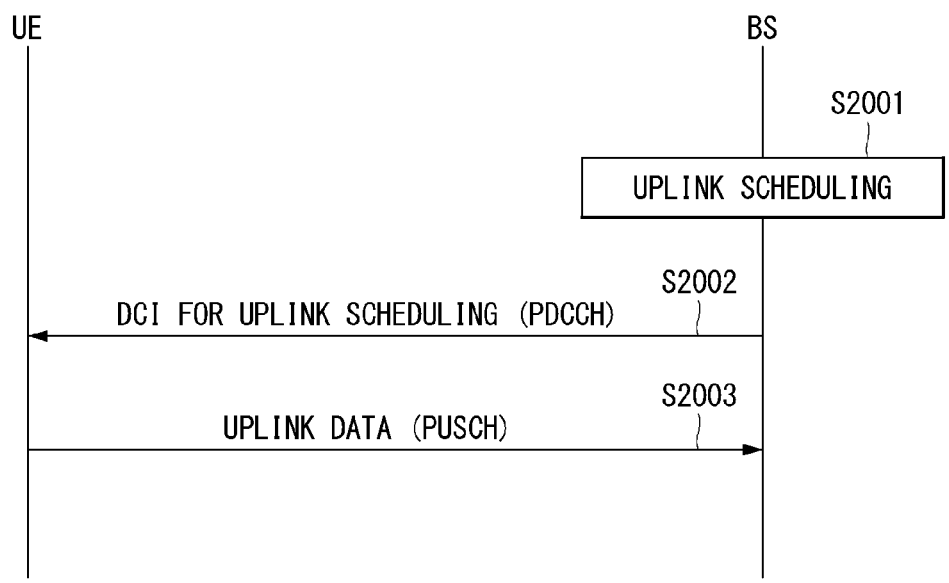

[FIG. 21]
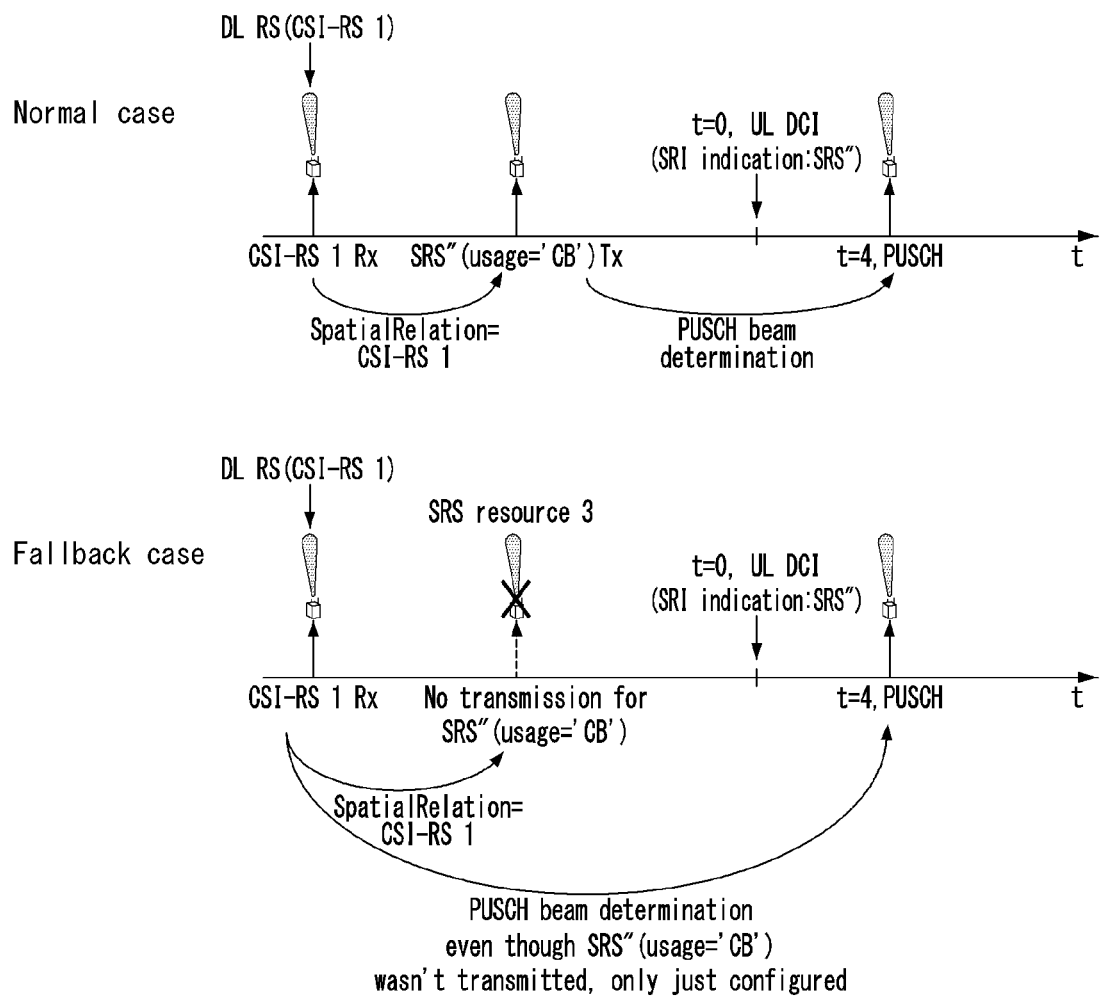

[FIG. 22]
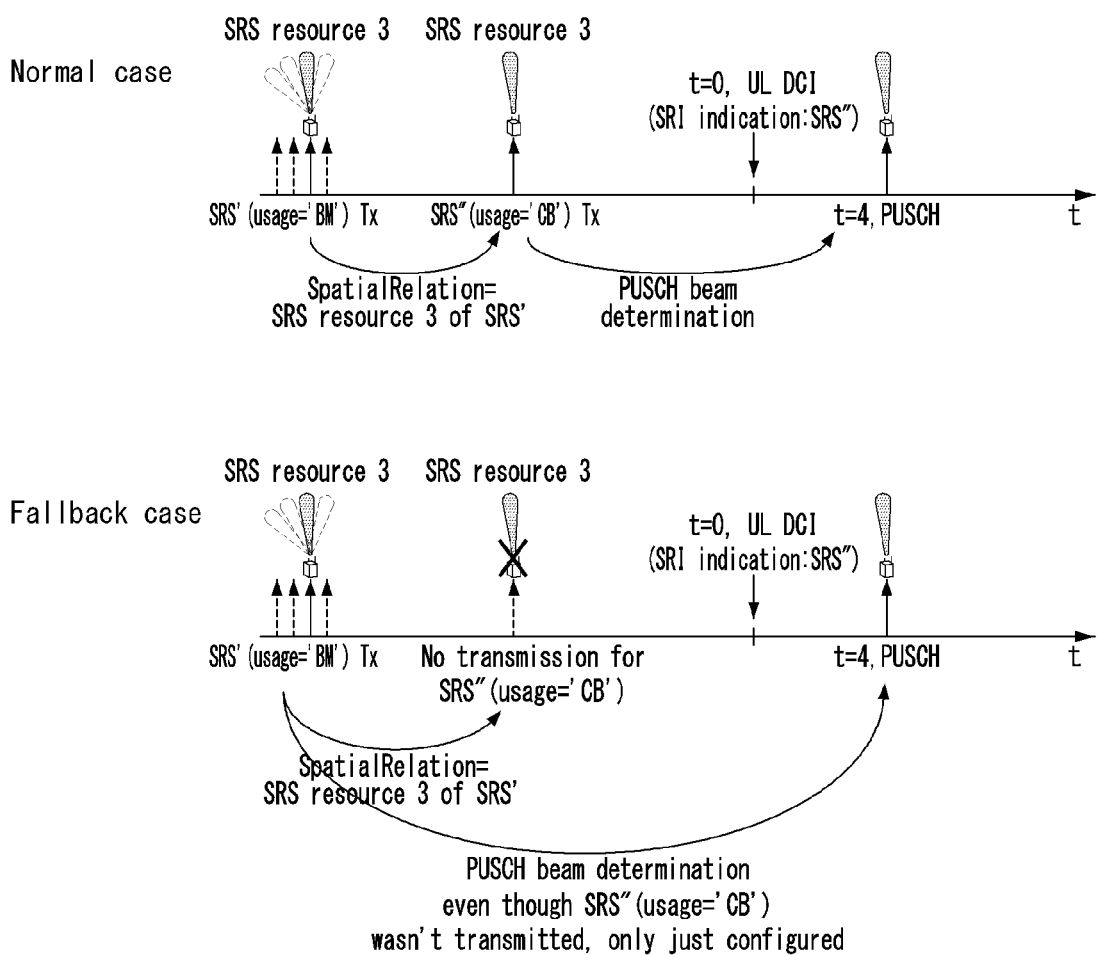

[FIG. 23]
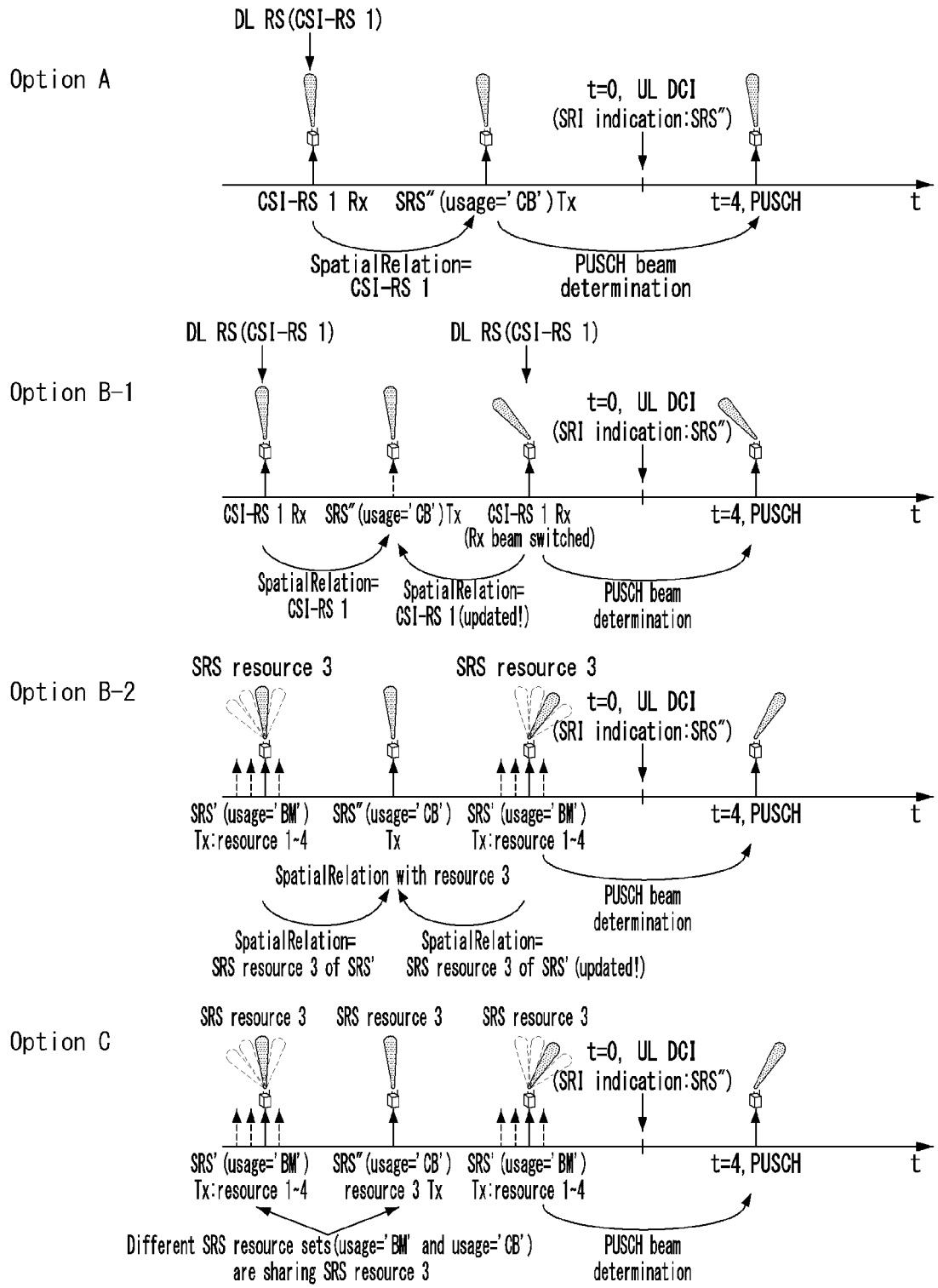

[FIG. 24]
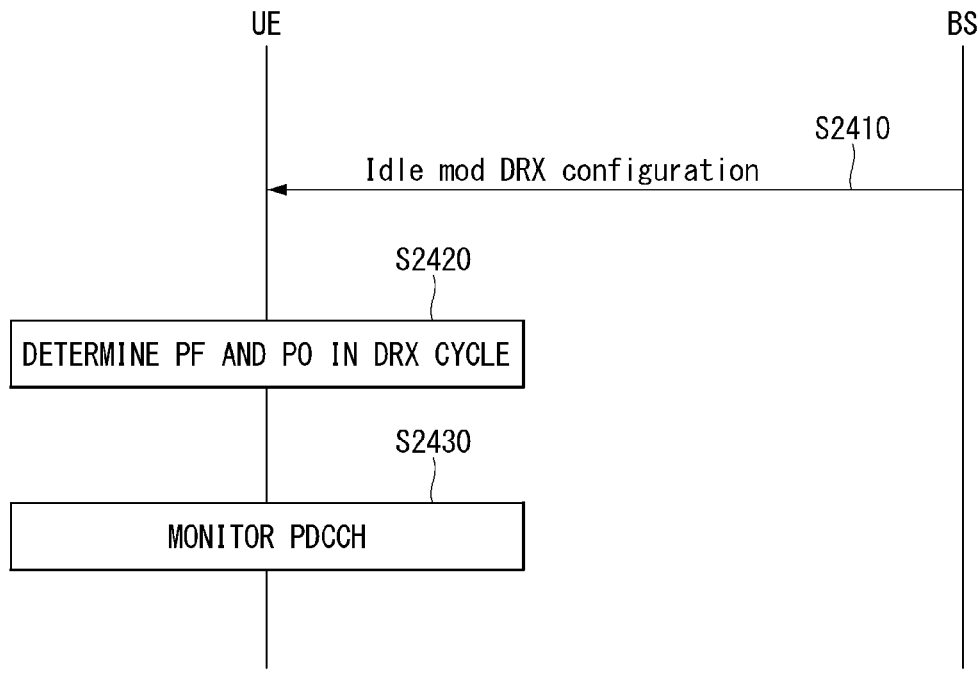
[FIG. 25]
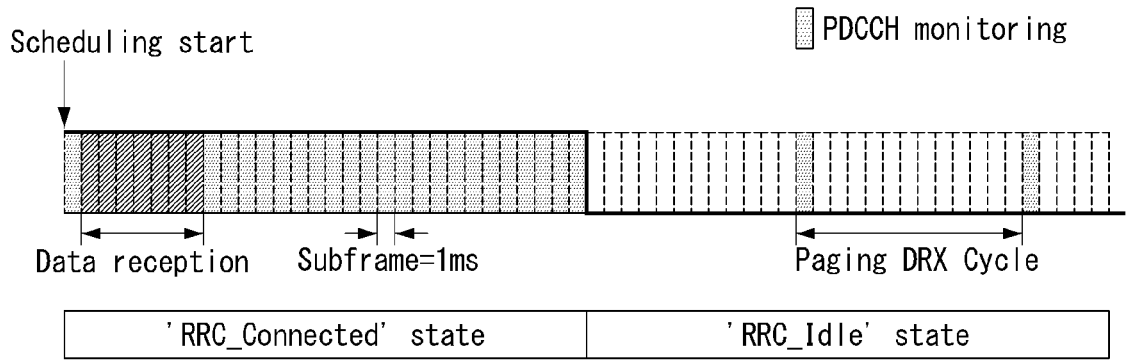

[FIG. 26]
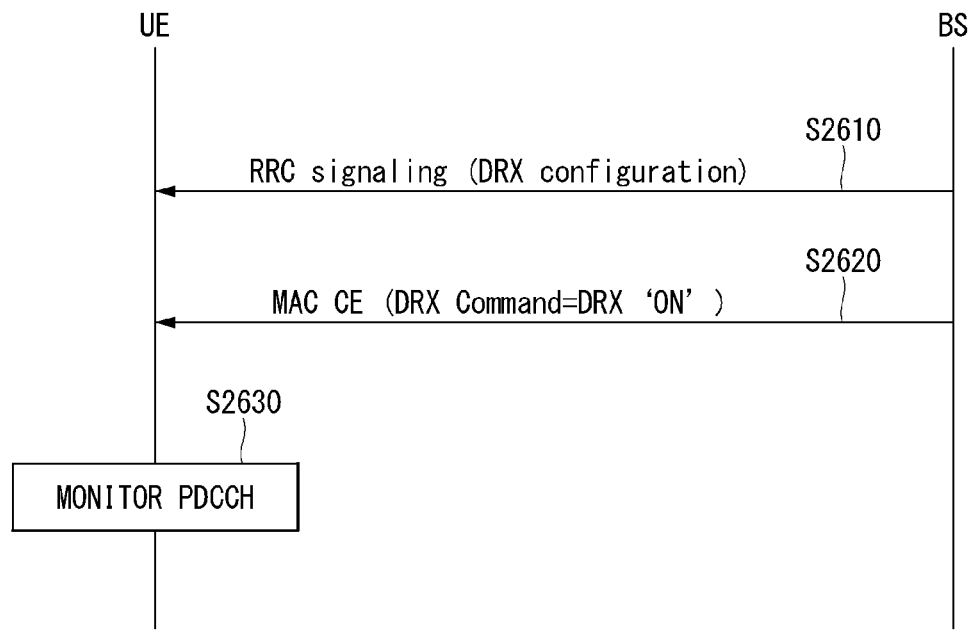
[FIG. 27]
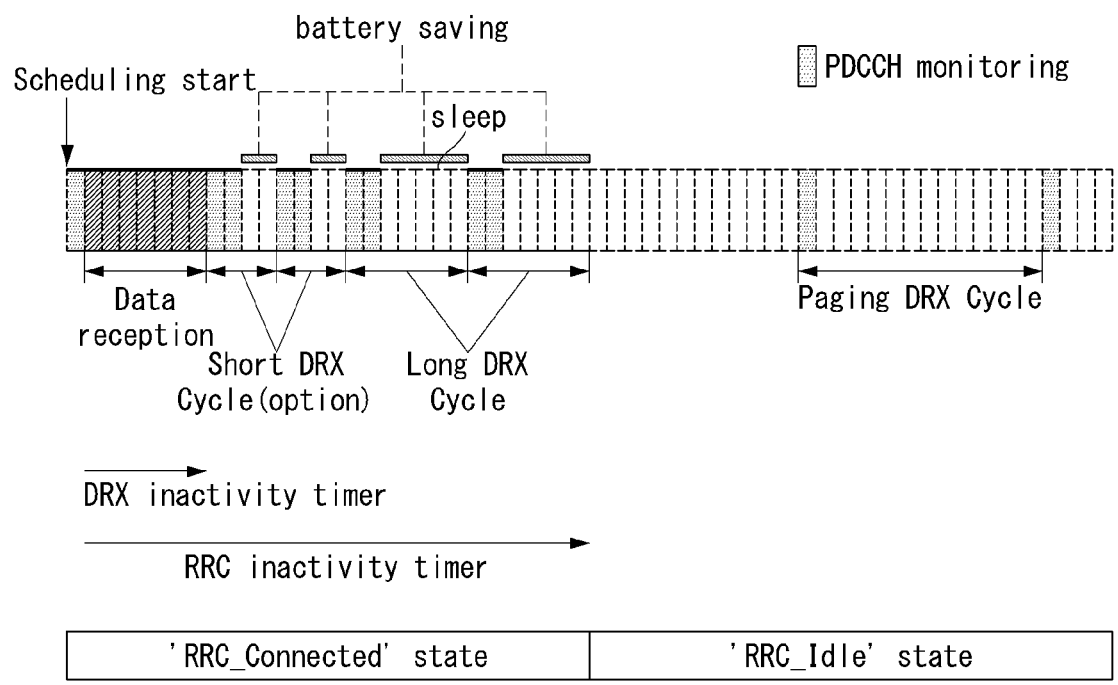

[FIG. 28]
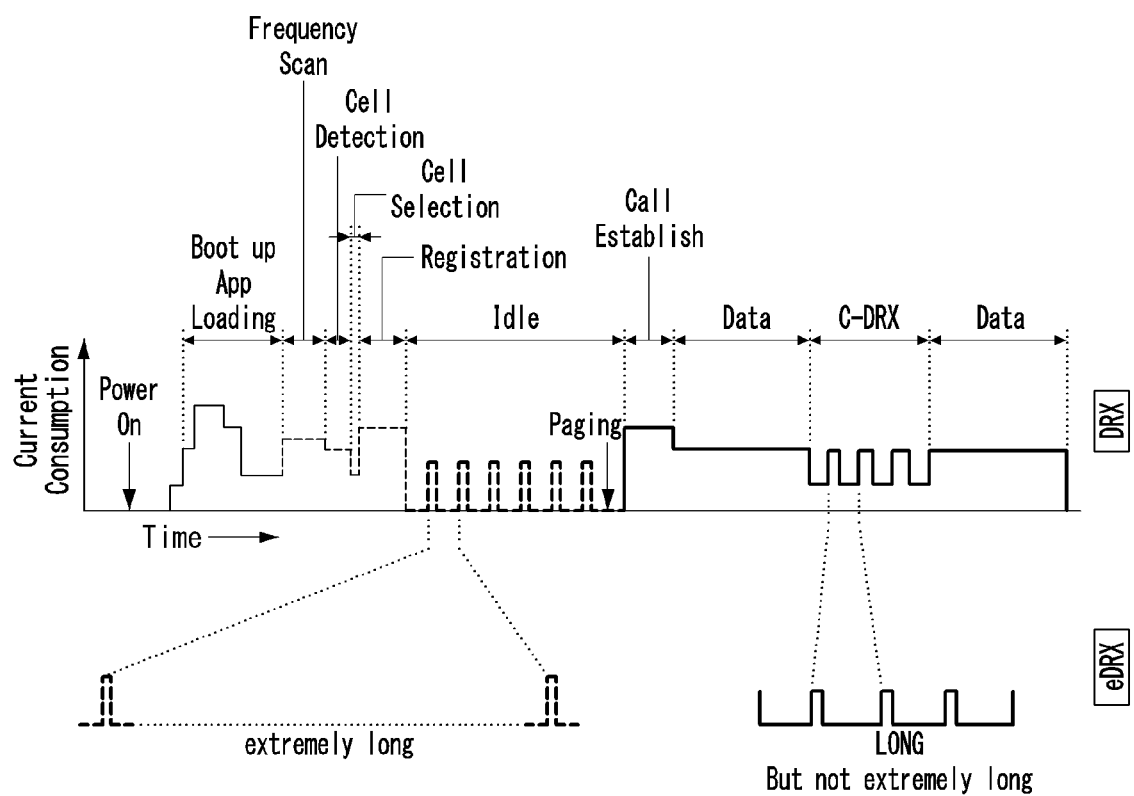

[FIG. 29]
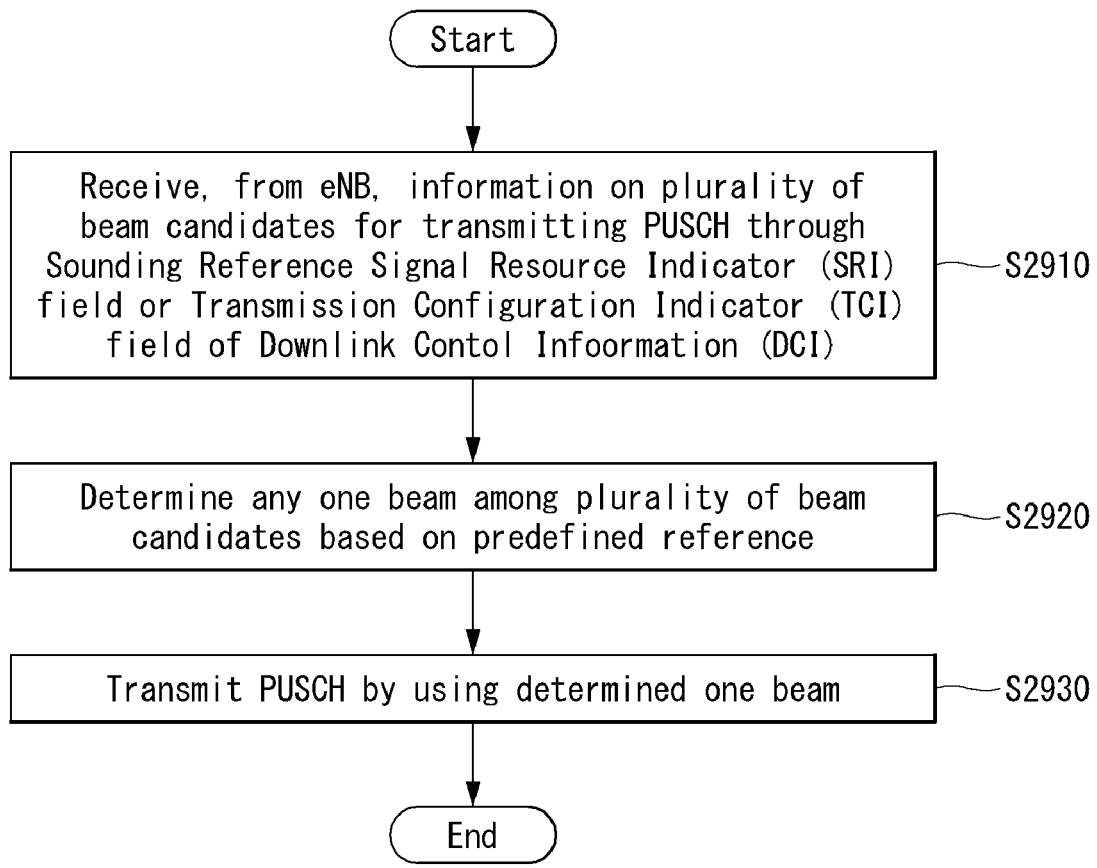

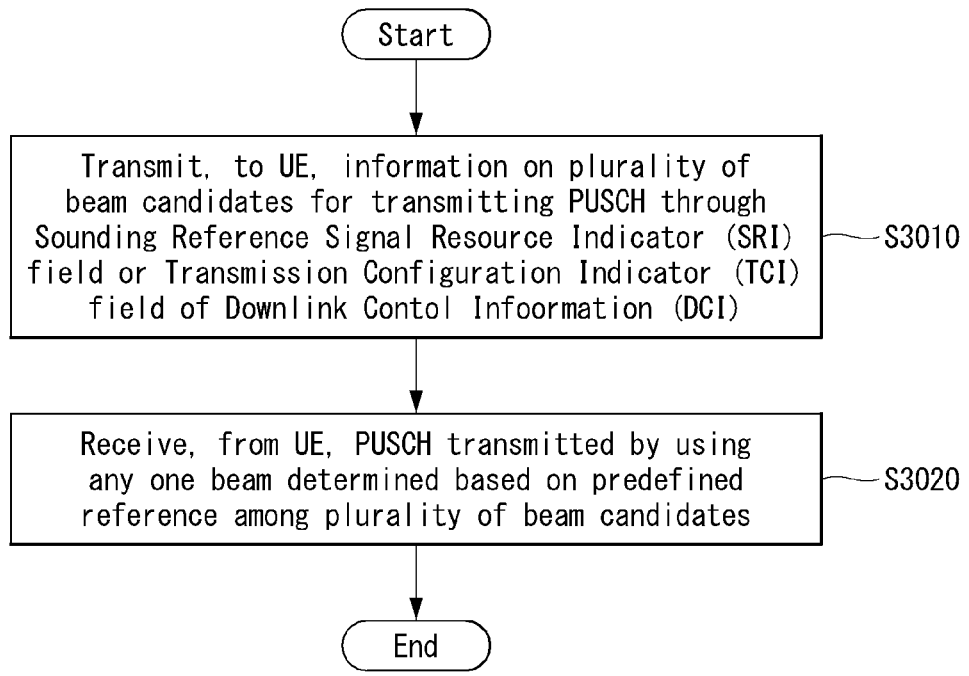
[FIG. 30]

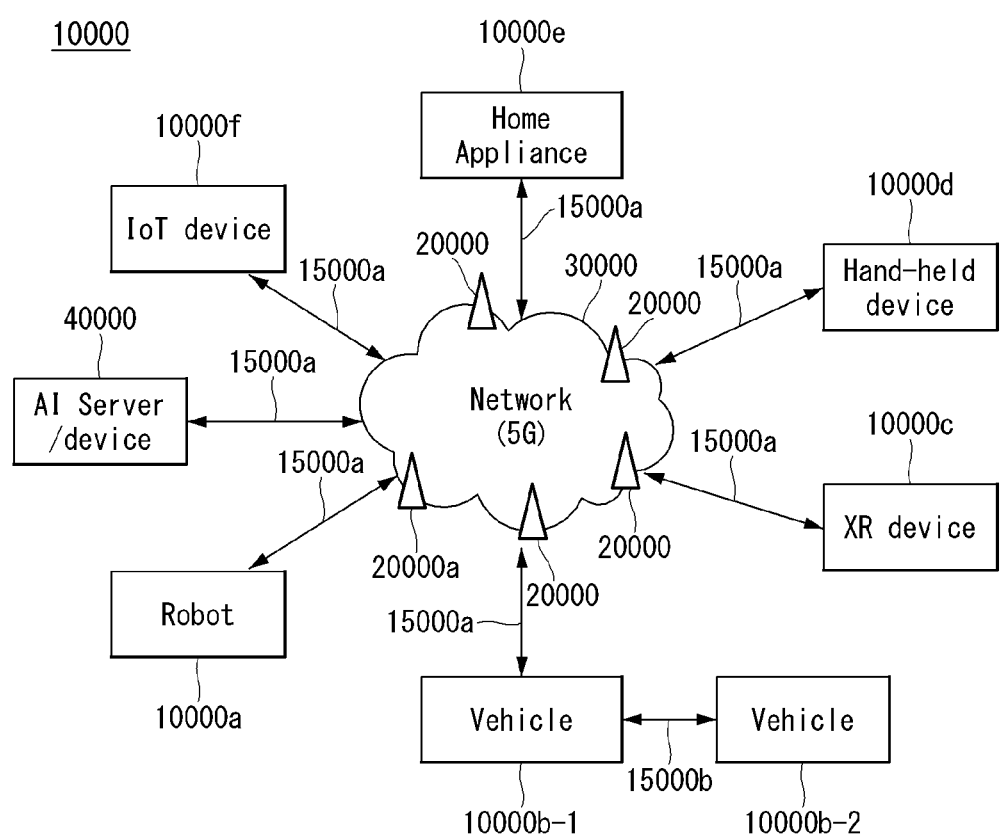
[FIG. 31]

[FIG. 32]
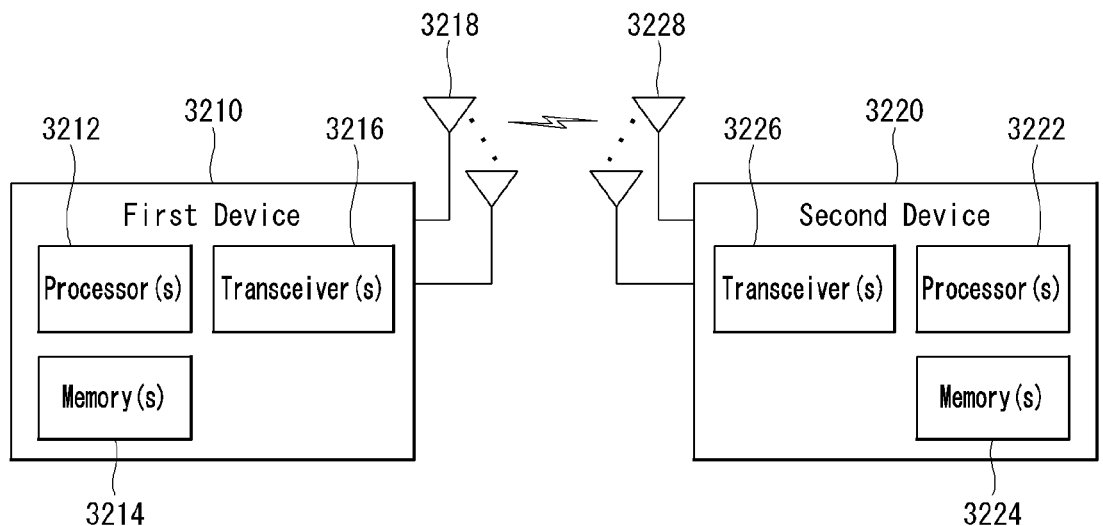
[FIG. 33]
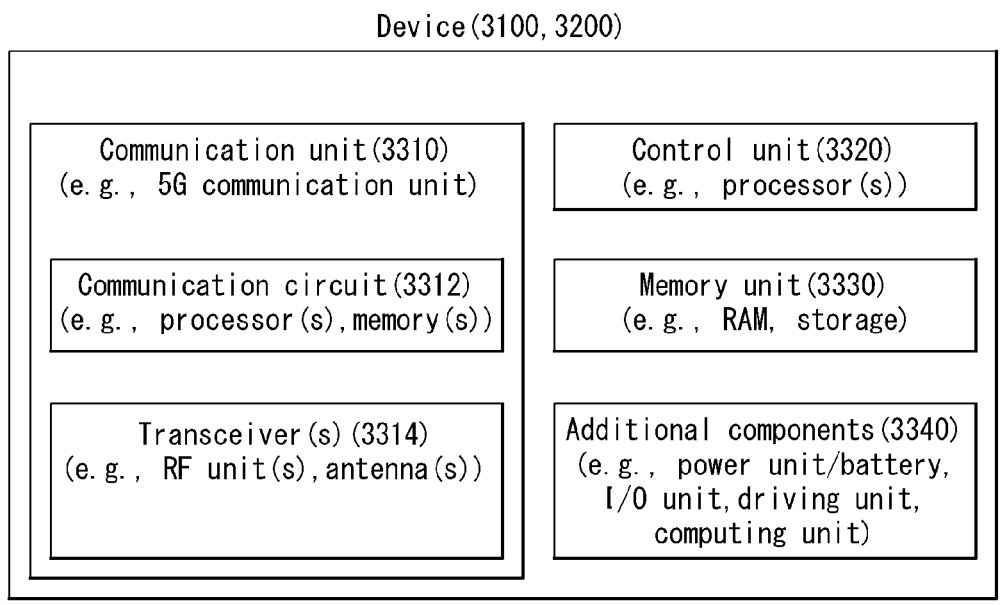

[FIG. 34]
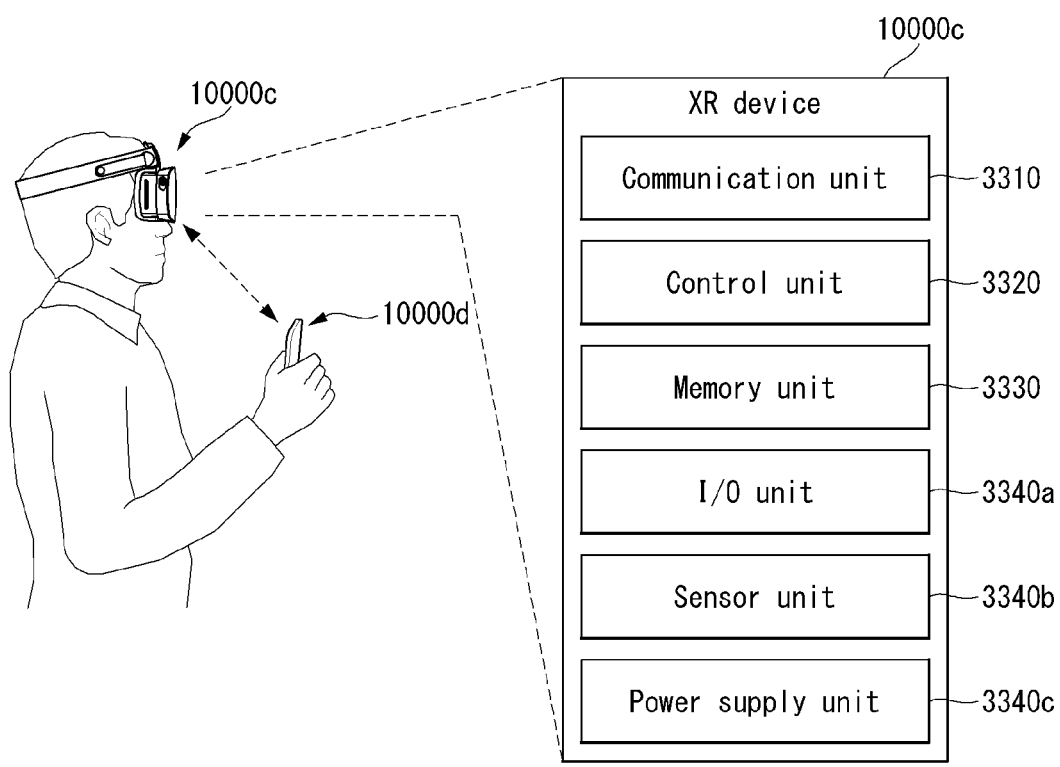

METHOD FOR TRANSMITTING PHYSICAL UPLINK SHARED CHANNEL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2020/001845, filed on Feb. 10, 2020, which claims the benefit of earlier filing date and right of priority to Korean Application No. 10-2019-0015061, filed on Feb. 8, 2019, the contents of which is hereby incorporated by reference herein in its entirety.

TECHNICAL FIELD

The present disclosure relates to a wireless communication system, and more particularly, to a method for transmitting physical uplink shared channel and a device for the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present disclosure provides a method for transmitting a Physical Uplink Shared Channel (PUSCH).

Further, the present disclosure provides a method for determining a beam used for transmitting the PUSCH.

Further, the present disclosure provides a method for determining a panel used for transmitting the PUSCH.

Objects of the disclosure are not limited to the foregoing, and other unmentioned objects would be apparent to one of ordinary skill in the art from the following description.

Technical Solution

The present disclosure provides a method for transmitting a Physical Uplink Shared Channel (PUSCH) in a wireless communication system in a wireless communication system.

Specifically, the method performed by a UE includes: receiving, from a base station, information on a plurality of beam candidates for transmitting the PUSCH through a Sounding Reference Signal Resource Indicator (SRI) field or a Transmission Configuration Indicator (TCI) field; determining any one beam of the plurality of beam candidates based on a predefined reference; and transmitting the PUSCH by the determined any one beam, in which the any one beam determined based on the predefined reference is a beam most recently used by the UE within a specific interval among the plurality of beam candidates.

Further, in the present disclosure, the method further includes: before the receiving of the information on the plurality of beam candidates, receiving, from the base station, a first sounding reference signal (SRS) resource set having a codebook or non-codebook purpose; and receiving, from the base station, a second SRS resource set for a beam management purpose, in which when the information on the plurality of beam candidates is transmitted through the SRI field, the plurality of beam candidates is i) a beam used for the UE to transmit, to the base station, the SRS using a first resource of the first SRS resource set, ii) a beam used for the UE to transmit, to the base station, a reference signal (RS) having a spatial relation with a second resource of the first SRS resource set indicated by the SRI field, and iii) a beam used for transmitting the SRS using a third resource when the third resource of the first SRS resource set indicated by the SRI field is included in the second SRS resource set, before a time of receiving the DCI.

Further, in the present disclosure, when the information on the plurality of beam candidates is transmitted through the TCI field, the plurality of beam candidates is i) a beam used for the UE to receive, form the base station, the downlink reference signal and ii) a beam used for transmitting the reference signal indicated by the TCI state related to the downlink reference signal indicated by the TCI field, before the time of receiving the DCI.

Further, in the present disclosure, the specific interval is from a time earlier than the time of receiving the DCI by k slots up to the time of receiving the DCI.

Further, in the present disclosure, the PUSCH is transmitted on a specific panel.

Further, in the present disclosure, the specific panel is a panel having a linkage to the any one beam determined based on the predefined reference.

Further, in the present disclosure, the linkage is transmitted from the base station through an MAC control element (CE).

Further, in the present disclosure, the PUSCH is a PUCCH.

Further, in the present disclosure, a UE for transmitting a Physical Uplink Shared Channel (PUSCH) in a wireless communication system includes: one or more transceivers; one or more processors; and one or more memories storing instructions for operations executed by the one or more processors and connected to the one or more processors, in which the operations include receiving, from a base station, information on a plurality of beam candidates for transmitting the PUSCH through a Sounding Reference Signal Resource Indicator (SRI) field or a Transmission Configuration Indicator (TCI) field, determining any one beam of the plurality of beam candidates based on a predefined reference, and transmitting the PUSCH by the determined any one beam, and the any one beam determined based on the predefined reference is a beam most recently used by the UE within a specific interval among the plurality of beam candidates.

Further, in the present disclosure, the operations further include: before the receiving of the information on the plurality of beam candidates, receiving, from the base station, a first sounding reference signal (SRS) resource set having a codebook or non-codebook purpose; and receiving, from the base station, a second SRS resource set for a beam management purpose, in which when the information on the plurality of beam candidates is transmitted through the SRI field, the plurality of beam candidates is i) a beam used for the UE to transmit, to the base station, the SRS using a first resource of the first SRS resource set, ii) a beam used for the UE to transmit, to the base station, a reference signal (RS) having a spatial relation with a second resource of the first SRS resource set indicated by the SRI field, and iii) a beam used for transmitting the SRS using a third resource when the third resource of the first SRS resource set indicated by the SRI field is included in the second SRS resource set, before a time of receiving the DCI.

Further, in the present disclosure, when the information on the plurality of beam candidates is transmitted through the TCI field, the plurality of beam candidates is i) a beam used for the UE to receive, form the base station, the downlink reference signal and ii) a beam used for transmitting the reference signal indicated by the TCI state related to the downlink reference signal indicated by the TCI field, before the time of receiving the DCI.

Further, in the present disclosure, a method for receiving a Physical Uplink Shared Channel (PUSCH) in a wireless communication system, which is performed by a base station, includes: transmitting, to a UE, information on a plurality of beam candidates for transmitting the PUSCH through a Sounding Reference Signal Resource Indicator (SRI) field or a Transmission Configuration Indicator (TCI) field; and receiving, from the UE, the PUSCH transmitted by using any one beam determined based on a predefined reference among the plurality of beam candidates, in which the any one beam determined based on the predefined reference is a beam most recently used by the UE within a specific interval among the plurality of beam candidates.

Further, in the present disclosure, a base station for receiving a Physical Uplink Shared Channel (PUSCH) in a wireless communication system includes: one or more transceivers; one or more processors; and one or more memories storing instructions for operations executed by the one or more processors and connected to the one or more processors, in which the operations include transmitting, to a UE, information on a plurality of beam candidates for transmitting the PUSCH through a Sounding Reference Signal Resource Indicator (SRI) field or a Transmission Configuration Indicator (TCI) field, and receiving, from the UE, the PUSCH transmitted by using any one beam determined based on a predefined reference among the plurality of beam candidates, and the any one beam determined based on the predefined reference is a beam most recently used by the UE within a specific interval among the plurality of beam candidates.

Further, in the present disclosure, a device includes: one or more memories and one or more processors functionally connected to the one or more memories, in which the one or more processors control the device to receive, from a base station, information on a plurality of beam candidates for transmitting the PUSCH through a Sounding Reference Signal Resource Indicator (SRI) field or a Transmission Configuration Indicator (TCI) field, determine any one beam of the plurality of beam candidates based on a predefined reference, and transmit the PUSCH by the determined any one beam, and the any one beam determined based on the predefined reference is a beam most recently used by the UE within a specific interval among the plurality of beam candidates.

Further, in the present disclosure, in one or more non-transitory computer-readable media storing one or more instructions, the one or more instructions executable by one or more processors includes instructions for instructing a user equipment (UE) to receive, from a base station, information on a plurality of beam candidates for transmitting the PUSCH through a Sounding Reference Signal Resource Indicator (SRI) field or a Transmission Configuration Indicator (TCI) field, determine any one beam of the plurality of beam candidates based on a predefined reference, and transmit the PUSCH by the determined any one beam, and the any one beam determined based on the predefined reference is a beam most recently used by the UE within a specific interval among the plurality of beam candidates.

Advantageous Effects

According to the present disclosure, a method for determining a beam used for transmitting a Physical Uplink Shared Channel (PUSCH) is provided to transmit an efficient PUSCH.

Further, according to the present disclosure, the method for determining a beam used for transmitting a Physical Uplink Shared Channel (PUSCH) is provided to reduce a delay for determination of the beam.

Effects of the disclosure are not limited to the foregoing, and other unmentioned effects would be apparent to one of ordinary skill in the art from the following description.

DESCRIPTION OF DRAWINGS

The accompanying drawings, which are included as part of the detailed description in order to provide a thorough understanding of the present disclosure, provide embodiments of the present disclosure and together with the description, describe the technical features of the present disclosure.

FIG. 1 is a perspective view of an augmented reality electronic device according to an embodiment of the present disclosure.

FIG. 2 illustrates an AI device according to an embodiment of the present disclosure.

FIG. 3 illustrates an AI server according to an embodiment of the present disclosure.

FIG. 4 illustrates an AI system according to an embodiment of the present disclosure.

FIG. 5 illustrates a structure of a radio frame in a wireless communication system to which the disclosure may be applied.

FIG. 6 is a diagram exemplifying a resource grid for one downlink slot in a wireless communication system to which the present disclosure may be applied.

FIG. 7 illustrates a structure of a downlink subframe in a wireless communication system to which the present disclosure may be applied.

FIG. 8 illustrates a structure of an uplink subframe in a wireless communication system to which the present disclosure may be applied.

FIG. 9 is a diagram illustrating physical channels used in a wireless communication system and a general signal transmitting method using the same to which the present disclosure may be applied.

FIG. 10 is a diagram illustrating an example of a beam used for beam management.

FIG. 11 is a flowchart showing an example of a downlink beam management procedure.

FIG. 12 illustrates an example of a downlink beam management procedure using a Channel State Information-Reference Signal (CSI-RS).

FIG. 13 is a flowchart showing an example of a receive beam determination process of a UE.

FIG. 14 is a flowchart showing an example of a transmit beam determination process of an eNB.

FIG. 15 illustrates an example of resource allocation in time and frequency domains associated with a DL BM procedure using the CSI-RS.

FIG. 16 illustrates an example of an uplink beam management procedure using a Sounding Reference Signal (SRS).

FIG. 17 is a flowchart showing an example of an uplink beam management procedure using the SRS.

FIG. 18 is a flowchart showing an example of a CSI associated procedure to which a method proposed in the present disclosure may be applied.

FIG. 19 is a flowchart showing an example of a downlink transmission/reception operation to which a method proposed in the present disclosure may be applied.

FIG. 20 is a flowchart showing an example of an uplink transmission/reception operation to which a method proposed in the present disclosure may be applied.

FIGS. 21 to 23 are diagrams illustrating an example of a method for determining a PUSCH beam to which a method proposed in the present disclosure may be applied.

FIG. 24 is a flowchart showing an example of a method for performing an Idle mode DRX operation.

FIG. 25 is a diagram illustrating an example of an Idle mode DRX operation.

FIG. 26 is a flowchart showing an example of a method for performing a C-DRX operation.

FIG. 27 is a diagram illustrating an example of a C-DRX operation.

FIG. 28 is a diagram illustrating an example of power consumption depending on a state of a UE.

FIG. 29 is a flowchart showing an operation process in a UE transmitting a physical uplink shared channel according to an embodiment of the present disclosure.

FIG. 30 is a flowchart showing an operation process in an eNB receiving a physical uplink shared channel according to an embodiment of the present disclosure.

FIG. 31 illustrates a communication system applied to the present disclosure.

FIG. 32 illustrates wireless devices applicable to the present disclosure.

FIG. 33 illustrates another example of the wireless device which may be applied to the present disclosure.

FIG. 34 illustrates an XR device which may be applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

5G new radio (NR) defines Enhanced Mobile Broadband (eMBB), Massive Machine Type Communications (mMTC), Ultra-Reliable and Low Latency Communications (URLLC), and vehicle-to-everything (V2X) according to a usage scenario.

In addition, the 5G NR standard is divided into standalone (SA) and non-standalone (NSA) depending on co-existence between the NR system and the LTE system.

In addition, the 5G NR supports various subcarrier spacings, and supports CP-OFDM in the downlink and CF-OFDM and DFT-s-OFDM (SC-OFDM) in the uplink.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

In addition, in the present disclosure, the expression of 'A and/or B may be construed as the same meaning as 'including at least one of A and B'.

5G Scenario

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOC SIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

<Artificial Intelligence (AI)>

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving (Autonomous-Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a perspective view of an augmented reality electronic device according to an embodiment of the present disclosure.

As illustrated in FIG. 1, the electronic device according to an embodiment of the present disclosure may include a frame 1000, a control unit 2000, and a display unit 3000.

The electronic device may be provided as a glass type (smart glass). The glass-type electronic device may be configured to be worn on the head of the human body and may include a frame (case, housing, etc.) 1000 therefor. The frame 1000 may be made of a flexible material to facilitate wearing.

The frame 1000 is supported on the head and has a space on which various components are mounted. As illustrated, electronic components such as the control unit 2000, a user input unit 1300, or an audio output unit 1400 may be mounted on the frame 1000. Furthermore, a lens covering at least one of a left eye and a right eye may be detachably mounted on the frame 1000.

As illustrated in FIG. 1, the frame 1000 may have a glass form worn on a face in the human body of a user, but the present disclosure is not limited thereto and the frame 100 may have a form such as goggles, etc., which are worn in close contact with the face of the user, etc.

Such a frame 1000 may include a front frame 1100 having at least one opening and a pair of side frames 1200 which extend in a first direction y intersecting the front frame 1100 and are parallel to each other.

The control unit 2000 is provided to control various electronic components provided in the electronic device.

The control unit 2000 may generate an image to be shown to the user or a video in which the images are continued. The control unit 2000 may include an image source panel generating the image and a plurality of lenses which diffuses and converges light generated from the image source panel.

The control unit 2000 may be fixed to any one side frame 1200 of both side frames 1200. For example, the control unit 2000 may be fixed to an inside or an outside of any one side frame 1200 or embedded and integrally formed in any one side frame 1200. Alternatively, the control unit 2000 may be fixed to the front frame 1100 or provided separately from the electronic device.

The display unit 3000 may be implemented in the form of Head Mounted Display (HMD). The HMD form refers to a display scheme that is mounted on the head and displays the video directly in front of the user's eye. When the user wears the electronic device, the display unit 3000 may be disposed to correspond to at least one of the left eye and the right eye so as to provide the video directly in front of the user's eye. In this figure, it is illustrated that the display unit 3000 is located at a portion corresponding to the right eye so as to output the video toward the right eye of the user.

The display unit 3000 may allow the image generated by the control unit 2000 to be displayed to the user while the user visually recognizes an external environment. For example, the display unit 3000 may project the image to a display area using a prism.

In addition, the display unit 3000 may be formed to be light-transmitting so that the projected image and a general field of view (a range which the user seeds through the eyes) may be seen at the same time. For example, the display unit 3000 may be translucent and may be formed by an optical element including glass.

In addition, the display unit 3000 may be inserted into or fixed to the opening included in the front frame 1100 or located on a rear surface (i.e., between the opening and the user) of the opening to be fixed to the front frame 1100. In the figure, a case where the display unit 3000 is located on the rear surface of the opening and fixed to the front frame 1100 is illustrated as an example, but unlike this, the display unit 3000 may be arranged and fixed at various locations of the frame 1000.

As illustrated in FIG. 1, in the electronic device, when image light for the image is incident on one side of the display unit 3000 by the control unit 2000, the image light is emitted to the other side through the display unit 3000 to show the image generated by the control unit 2000 to the user.

As a result, the user may view the image generated by the control unit 2000 simultaneously while viewing the external environment through the opening of the frame 1000. That is, the video output through the display unit 3000 may be viewed as overlapping with the general field of view. The electronic device may provide augmented reality (AR) that superimposes a virtual image on a real image or a background by using such display characteristics.

FIG. 2 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 2, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 3 illustrates an AI server 200 according to an embodiment of the disclosure.

Referring to FIG. 3, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 4 illustrates an AI system 1 according to an embodiment of the disclosure.

Referring to FIG. 4, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 4 may be considered to be detailed embodiments of the AI device 100 shown in FIG. 2.

<AI+Robot>

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI+Self-Driving>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100*b* may perform an operation or may run by controlling the driving unit based on a user's control/interaction. In this case, the self-driving vehicle 100*b* may obtain intention information of an interaction according to a user' behavior or voice speaking, may determine a response based on the obtained intention information, and may perform an operation.

<AI+XR>

An AI technology is applied to the XR device 100*c*, and the XR device 100*c* may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

<AI+Robot+Self-Driving>

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

<AI+Robot+XR>

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100*a*, that is, a target of control/interaction within an XR image, obtains sensor information from sensors including a camera, the robot 100*a* or the XR device 100*c* may generate an XR image based on the sensor information, and the XR device 100*c* may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.
<AI+Self-Driving+XR>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Overview of a System to which the Present Disclosure May Be Applied

FIG. 5 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$ in FIG. 5. A UL and DL transmission includes the radio frame having a duration of $T\_f=307200*T\_s=10$ ms.

(a) of FIG. 5 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission in the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 5 shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

FIG. 7 shows the structure of a downlink subframe in a wireless communication system to which an embodiment of the present disclosure may be applied.

Referring to FIG. 7, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 5 is just an example, and the number of subcarriers included in a radio frame, the number of slots included in a subframe and the number of OFDM symbols included in a slot may be changed in various manners.

FIG. 6 is a diagram illustrating a resource grid for one downlink slot in a wireless communication system to which an embodiment of the present disclosure may be applied.

Referring to FIG. 6, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

An enhanced PDCCH (EPDCCH) carries a UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be set in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be set in one PRB pair in which the UE monitors EPDCCH transmission.

Different coding rates may be implemented for the EPCCH by merging different numbers of ECCEs. The EPCCH may use localized transmission or distributed transmission, and as a result, the mapping of the ECCE to the RE in the PRB may vary.

FIG. 8 shows the structure of an uplink subframe in a wireless communication system to which an embodiment of the present disclosure may be applied.

Referring to FIG. 8, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

FIG. 9 is a diagram illustrating physical channels used in a wireless communication system and a general signal transmitting method using the same to which the present disclosure may be applied.

Referring to FIG. 9, in a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S201). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message (Random Access Response (RAR) message) for the preamble through the PDCCH and a corresponding PDSCH. In the case of a contention based RACH, a Contention Resolution Procedure may be additionally performed (S206).

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Meanwhile, as more and more communication devices require larger communication capacity, there is a need for improved mobile broadband communication compared to the existing radio access technology. Further, massive machine type communications (MTCs), which provide various services anytime and anywhere by connecting many devices and objects, are one of the major issues to be considered in the next generation communication. In addition, a communication system design considering a service/

UE sensitive to reliability and latency is being discussed. As such, the introduction of next generation radio access technology considering enhanced mobile broadband communication (eMBB), massive MTC (mMTC), ultra-reliable and low latency communication (URLLC) is discussed, and in the present disclosure, the technology is called new RAT for convenience.

NR

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next generation radio access technology considering enhanced mobile broadband communication, massive MTC, ultra-reliable and low latency communication (URLLC) is discussed, and in the present disclosure, the technology is called NR for convenience.

OFDM Numerology

In a New RAT system uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger there than. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

FIG. 10 is a diagram illustrating an example of a beam used for beam management.

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

As illustrated in FIG. 10, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

FIG. 11 is a flowchart showing an example of a downlink beam management procedure.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S1110).

Table 3 shows an example of CSI-ResourceConfig IE and as shown in Table A, a BM configuration using the SSB is not separately defined and the SSB is configured like the CSI-RS resource.

TABLE 3

```
-- ASN1START
-- TAG-CSI-RESOURCECONFIG-START
CSI-ResourceConfig ::=                       SEQUENCE {
    csi-ResourceConfigId                     CSI-ResourceConfigId,
    csi-RS-ResourceSetList                   CHOICE {
        nzp-CSI-RS-SSB
    SEQUENCE {
            nzp-CSI-RS-ResourceSetList       SEQUENCE
(SIZE (1..maxNrofNZP-CSI-RS-ResourceSetsPerConfig)) OF NZP-CSI-RS-ResourceSetId
OPTIONAL,
            csi-SSB-ResourceSetList
       SEQUENCE (SIZE (1..maxNrofCSI-SSB-ResourceSetsPerConfig)) OF CSI-SSB-
ResourceSetId OPTIONAL
        },
        csi-IM-ResourceSetList               SEQUENCE        (SIZE
(1..maxNrofCSI-IM-ResourceSetsPerConfig)) OF CSI-IM-ResourceSetId
    },
    bwp-Id                                   BWP-Id,
    resourceType                             ENUMERATED
{aperiodic, semiPersistent, periodic },
    ...
}
-- TAG-CSI-RESOURCECONFIGTOADDMOD-STOP
-- ASN1STOP
```

In Table 3, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S1120).

When CSI-RS reportConfig associated with reporting of SSBRI and L1-RSRP is configured, the UE (beam) reports to the eNB best SSBRI and L1-RSRP corresponding thereto (S1130).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resourcesForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols. Further, the UE does not expect that different periodicities are received at periodicityAndOffset in all CSI-RS resources in NZP-CSI-RS-Resourceset.

On the contrary, when Repetition is configured to 'OFF', the Repetition is associated with the Tx beam sweeping procedure of the eNB. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

FIG. 12 illustrates an example of a downlink beam management procedure using a Channel State Information-Reference Signal (CSI-RS).

(a) of FIG. 12 illustrates an Rx beam determination (or refinement) procedure of the UE and (b) of FIG. 12 illustrates a Tx beam sweeping procedure of the eNB. Further, (a) of FIG. 12 illustrates a case where the repetition parameter is configured to 'ON' and (b) of FIG. 12 illustrates a case where the repetition parameter is configured to 'OFF'.

Referring to (a) of FIG. 12 and FIG. 13, an Rx beam determination process of the UE will be described.

FIG. 13 is a flowchart showing an example of a receive beam determination process of a UE.

The UE receives, from the eNB, NZP CSI-RS resource set IE including higher layer parameter repetition through RRC signaling (S1310). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1320).

The UE determines the Rx beam thereof (S1330).

The UE skips CSI report (S1340). In this case, reportQuantity of CSI report config may be configured as 'No report (or None)'.

In other words, the UE may skip the CSI report when repetition 'ON' is configured.

Referring to (b) of FIG. 12 and FIG. 14 a Tx beam determination process of the eNB will be described.

FIG. 14 is a flowchart showing an example of a transmit beam determination process of an eNB.

The UE receives, from the eNB, NZP CSI-RS resource set IE including higher layer parameter repetition through RRC signaling (S1410). Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1420).

The UE selects (or determines) a best beam (S1430).

The UE reports to the eNB an ID for the selected beam and related quality information (e.g., L1-RSRP) (S1440). In this case, reportQuantity of CSI report config may be configured as 'CRI+L1-RSRP'.

In other words, when the CSI-RS is transmitted for the BM, the UE reports to the eNB the CRI and L1-RSRP therefor.

FIG. 15 illustrates an example of resource allocation in time and frequency domains associated with a DL BM procedure using the CSI-RS.

Specifically, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 4 shows an example of TCI-State IE.

The TCI-State IE is associated with a quasi co-location (QCL) type corresponding to one or two DL reference signals (RSs).

TABLE 4

```
-- ASN1START
-- TAG-TCI-STATE-START
TCI-State ::=                    SEQUENCE {
    tci-StateId                          TCI-StateId,
    qcl-Type1                            QCL-Info,
    qcl-Type2                            QCL-Info
              OPTIONAL,     -- Need R
    ...
}
QCL-Info ::=                     SEQUENCE {
    cell                                 ServCellIndex
              OPTIONAL,     -- Need R
    bwp-Id                               BWP-Id
              OPTIONAL, -- Cond CSI-RS-Indicated
    referenceSignal                      CHOICE {
        csi-rs                               NZP-CSI-
RS-ResourceId,
        ssb
        SSB-Index
    },
    qcl-Type                             ENUMERATED
{typeA, typeB, typeC, typeD},
    ...
}
-- TAG-TCI-STATE-STOP
-- ASN1STOP
```

In Table 4, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

Quasi-Co Location (QCL)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.
UL BM In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K ($\geq 1$) SRS resources (higher later parameter SRS-resources). Here, K is a natural number and a maximum value of K is indicated by SRS capability.

Similarly to the DL BM, a UL BM procedure may also be divided into Tx beam sweeping of the UE and Rx beam sweeping of the eNB.

FIG. 16 illustrates an example of an uplink beam management procedure using a Sounding Reference Signal (SRS). (a) of FIG. 16 illustrates an Rx beam determination procedure of the eNB and (b) of FIG. 16 illustrates a Tx beam sweeping procedure of the UE.

FIG. 17 is a flowchart showing an example of an uplink beam management procedure using the SRS.

The UE receives, from the eNB, RRC signaling (e.g., SRS-Config IE) including a (higher layer parameter) usage parameter configured as 'beam management' (S1710).

Table 5 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 5

```
-- ASN1START
-- TAG-MAC-CELL-GROUP-CONFIG-START
SRS-Config ::=                                           SEQUENCE {
    srs-ResourceSetToReleaseList                 SEQUENCE
(SIZE(1..maxNrofSRS-ResourceSets)) OF SRS-ResourceSetId
        OPTIONAL,    -- Need N
    srs-ResourceSetToAddModList                  SEQUENCE
(SIZE(1..maxNrofSRS-ResourceSets)) OF SRS-ResourceSet
        OPTIONAL,    -- Need N
    srs-ResourceToReleaseList                    SEQUENCE
(SIZE(1..maxNrofSRS-Resources)) OF SRS-ResourceId
        OPTIONAL,    -- Need N
    srs-ResourceToAddModList                     SEQUENCE
(SIZE(1..maxNrofSRS-Resources)) OF SRS-Resource
        OPTIONAL,    -- Need N
    tpc-Accumulation                             ENUMERATED
{disabled}
                            OPTIONAL,    -- Need S
    ...
}
SRS-Resource Set ::=                             SEQUENCE {
    srs-ResourceSetId                            SRS-
ResourceSetId,
    srs-ResourceIdList                           SEQUENCE
(SIZE(1..maxNrofSRS-ResourcesPerSet)) OF SRS-ResourceId  OPTIONAL,    --
Cond Setup
    resourceType                                 CHOICE {
        aperiodic
        SEQUENCE {
            aperiodicSRS-ResourceTrigger         INTEGER
```

TABLE 5-continued

```
                (1..maxNrofSRS-TriggerStates-1),
                    csi-RS
              NZP-CSI-RS-ResourceId
                        OPTIONAL,    -- Cond NonCodebook
                    slotOffset
              INTEGER (1..32)
                        OPTIONAL,    -- Need S
                ...
            },
            semi-persistent
            SEQUENCE {
                associatedC SI-RS
              NZP-CSI-RS-ResourceId
                        OPTIONAL, -- Cond NonCodebook
                ...
            },
            periodic
            SEQUENCE {
                associatedC SI-RS
              NZP-CSI-RS-ResourceId
                        OPTIONAL, -- Cond NonCodebook
                ...
            }
        },
        usage
        ENUMERATED {beamManagement, codebook, nonCodebook, antennaSwitching},
        alpha                                                Alpha
                        OPTIONAL, -- Need S
        p0
        INTEGER (-202..24)
                                        OPTIONAL, -- Cond Setup
        pathlossReferenceRS                         CHOICE {
            ssb-Index
        SSB-Index,
            csi-RS-Index                                NZP-CSI-
    RS-ResourceId
    SRS-SpatialRelationInfo ::=     SEQUENCE {
        servingCellId                       ServCellIndex
                                            OPTIONAL,     -- Need S
        reference Signal                    CHOICE {
            ssb-Index                                    SSB-
    Index,
            csi-RS-Index                       NZP-CSI-RS-
    ResourceId,
            srs
            SEQUENCE {
                    resourceId
                SRS-ResourceId,
                    uplinkBWP
                BWP-Id
            }
        }
    }
    SRS-ResourceId ::=                  INTEGER
    (0..maxNrofSRS-Resources-1)
```

In Table 5, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1720). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1730).

More specifically, for P-SRS in which 'SRS-ResourceConfigType' is configured as 'periodic':

ii) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1740).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to (a) of FIG. 16.

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to (b) of FIG. 16.

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Channel State Information (CSI) Related Procedure

FIG. 18 is a flowchart showing an example of a CSI associated procedure to which a method proposed in the present disclosure may be applied.

In a New Radio (NR) system, a channel state information-reference signal (CSI-RS) is used for time and/or frequency tracking, CSI computation, layer 1 (L1)-reference signal received power (RSRP) computation, and mobility.

The expression of 'A and/or B' used in the present disclosure may be construed as the same meaning as 'including at least one of A and B'.

The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

In order to perform one of usages of the CSI-RS, a terminal (e.g., user equipment (UE)) receives, from a base station (e.g., general Node B or gNB), configuration information related to the CSI through radio resource control (RRC) signaling (S1810).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like.

The CSI-IM resource set is identified by a CSI-IM resource set identifier (ID) and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

In other words, the CSI resource configuration related information may include a CSI-RS resource set list and the CSI-RS resource set list may include at least one of a NZP CSI-RS resource set list, a CSI-IM resource set list, or a CSI-SSB resource set list.

The CSI resource configuration related information may be expressed as CSI-ResourceConfig IE.

The CSI-RS resource set is identified by a CSI-RS resource set ID and one resource set includes at least one CSI-RS resource.

Each CSI-RS resource is identified by a CSI-RS resource ID.

As shown in Table 6, parameters (e.g., a BM related 'repetition' parameter and a tracking related 'trs-Info' parameter) representing the usage may be configured for each NZP CSI-RS resource set.

Table 6 shows an example of NZP CSI-RS resource set IE.

TABLE 6

```
-- ASN1START
-- TAG-NZP-CSI-RS-RESOURCESET-START
NZP-CSI-RS-ResourceSet ::=        SEQUENCE {
   nzp-CSI-ResourceSetId          NZP-CSI-RS-ResourceSetId,
   nzp-CSI-RS-Resources           SEQUENCE
(SIZE
(1..maxNrofNZP-CSI-RS-ResourcesPerSet)) OF NZP-CSI-RS-ResourceId,
   repetition                     ENUMERATED
{on, off }
                                  OPTIONAL,
   aperiodicTriggeringOffset      INTEGER(0..4)
            OPTIONAL,   -- Need S
   trs-Info                       ENUMERATED {true}
            OPTIONAL,   -- Need R
   ...
}
-- TAG-NZP-CSI-RS-RESOURCESET-STOP
-- ASN1STOP
```

In Table 6, repetition parameter as a parameter representing whether the same beam is repeatedly transmitted indicates whether the repetition is 'ON' or 'OFF' for each NZP CSI-RS resource set.

The Tx beam used in the present disclosure may be construed as the same meaning as the spatial domain transmission filter and the Rx beam may be construed as the same meaning as the spatial domain reception filter.

For example, when the repetition parameter of Table 6 is configured to 'OFF', the UE does not assume that the NZP CSI-RS resource(s) in the resource set are transmitted with the same spatial domain transmission filter and the same Nrofports in all symbols.

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting.

The time domain behavior may be periodic, aperiodic, or semi-persistent.

In addition, the CSI report configuration related information may be expressed as CSI-ReportConfig IE and Table 7 below shows an example of CSI-ReportConfig IE.

TABLE 7

```
-- ASN1START
-- TAG-CSI-RESOURCECONFIG-START
CSI-ReportConfig ::=                   SEQUENCE {
    reportConfigId                                    CSI-ReportConfigId,
    carrier
    ServCellIndex                      OPTIONAL,  -- Need S
    resourcesForChannelMeasurement                    CSI-ResourceConfigId,
    csi-IM-ResourcesForInterference                   CSI-ResourceConfigId
    OPTIONAL,       -- Need R
    nzp-CSI-RS-ResourcesForInterference               CSI-ResourceConfigId
    OPTIONAL,       -- Need R
    reportConfigType                                  CHOICE {
        periodic
        SEQUENCE {
            reportSlotConfig
            CSI-ReportPeriodicityAndOffset,
            pucch-CSI-ResourceList
            SEQUENCE (SIZE (1..maxNrofBWPs)) OF PUCCH-CSI-Resource
        },
        semiPersistentOnPUCCH
        SEQUENCE {
            reportSlotConfig
            CSI-ReportPeriodicityAndOffset,
            pucch-CSI-ResourceList
            SEQUENCE (SIZE (1..maxNrofBWPs)) OF PUCCH-CSI-Resource
        },
        semiPersistentOnPUSCH
        SEQUENCE {
            reportSlotConfig
            ENUMERATED {sl5, sl10, sl20, sl40, sl80, sl160, sl320},
            reportSlotOffsetList               SEQUENCE
(SIZE (1.. maxNrofUL-Allocations)) OF INTEGER(0..32),
            p0alpha
            P0-PUSCH-AlphaSetId
        },
        aperiodic
        SEQUENCE {
            reportSlotOffsetList               SEQUENCE
(SIZE (1..maxNrofUL-Allocations)) OF INTEGER(0..32)
        }
    },
    reportQuantity                                    CHOICE {
        none
        NULL,
        cri-RI-PMI-CQI                                NULL,
        cri-RI-i1
        NULL,
        cri-RI-i1-CQI
        SEQUENCE {
            pdsch-BundleSizeForCSI
            ENUMERATED {n2, n4}       OPTIONAL
        },
        cri-RI-CQI
        NULL,
        cri-RSRP
        NULL,
        ssb-Index-RSRP
        NULL,
        cri-RI-LI-PMI-CQI                             NULL
    },
```

In addition, the UE measures CSI based on configuration information related to the CSI (S1820).

The CSI measurement may include (1) a CSI-RS reception process (S1622) and (2) a process of computing the CSI through the received CSI-RS (S1824).

A sequence for the CSI-RS is generated by Equation 1 below and an initialization value of pseudo-random sequence C(i) is defined by Equation 2.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

$$c_{init} = (2^{10}(N_{symb}^{slot} n_{s,f}^{\mu} + 1 + 1)(2n_{ID} + 1) + n_{ID}) \bmod 2^{31} \quad \text{[Equation 2]}$$

In Equations 1 and 2, $n_{s,f}^{\mu}$ represents a slot number in a radio frame and pseudo-random sequence generator is initialized to Cint at a start of each OFDM symbol which is $n_{s,f}^{\mu}$.

In addition, 1 represents an OFDM symbol number in a slot and $n_{ID}$ is the same as higher-layer parameter scramblingID.

In addition, for the CSI-RS, resource element (RE) mapping is configured time and frequency domains by higher layer parameter CSI-RS-ResourceMapping.

Table 8 shows an example of CSI-RS-ResourceMapping IE.

TABLE 8

```
-- ASN1START
-- TAG-CSI-RS-RESOURCEMAPPING-START
CSI-RS-ResourceMapping ::=          SEQUENCE {
    frequencyDomainAllocation       CHOICE {
        row1                                       BIT
STRING (SIZE (4)),
        row2                                       BIT
STRING (SIZE (12)),
        row4                                       BIT
STRING (SIZE (3)),
        other                                      BIT
STRING (SIZE (6))
    },
    nrofPorts                                  ENUMERATED
{p1,p2,p4,p8,p12,p16,p24,p32},
    firstOFDMSymbolInTimeDomain                INTEGER (0..13),
    firstOFDMSymbolInTimeDomain2               INTEGER (2..12)
            OPTIONAL,       -- Need R
    cdm-Type                                   ENUMERATED
{noCDM, fd-CDM2, cdm4-FD2-TD2, cdm8-FD2-TD4},
    density                                    CHOICE {
        dot5
        ENUMERATED {evenPRBs, oddPRBs},
        one
        NULL,
        three                                     NULL,
        spare                                     NULL
    },
    freqBand                                   CSI-FrequencyOccupation,
    ...
}
```

In Table 8, a density (D) represents a density of the CSI-RS resource measured in RE/port/physical resource block (PRB) and nrofPorts represents the number of antenna ports.

Further, the UE reports the measured CSI to the eNB.

Here, in the case where a quantity of CSI-ReportConfig of Table 8 is configured to 'none (or No report)', the UE may skip the report.

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

In summary, in the case where the repetition is configured to 'ON' and 'OFF', 'No report', 'SSB Resource Indicator (SSBRI) and L1-RSRP', and 'CSI-RS Resource Indicator (CRI) and L1-RSRP' may be all available as the CSI report.

Alternatively, in the case where the repetition is 'OFF', CSI report of 'SSBRI and L1-RSRP' or 'CRI and L1-RSRP' may be defined to be transmitted and in the case where the repetition is 'ON', 'No report', 'SSBRI and L1-RSRP', or 'CRI and L1-RSRP' may be defined to be transmitted.

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

- When one resource setting is configured, the resource setting (given by higher layer parameter resourcesForChannelMeasurement) is used for channel measurement for L1-RSRP computation.
- When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.
- When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured through RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

Downlink Transmission/Reception Operation

FIG. 19 is a flowchart showing an example of a downlink transmission/reception operation to which a method proposed in the present disclosure may be applied.

Referring to FIG. 19, the eNB schedules downlink transmission such as a frequency/time resource, a transport layer, a donwlink precoder, MCS, etc., (S1901). In particular, the eNB may determine a beam for PDSCH transmission to the UE through the aforementioned operations.

The UE receives Downlink Control Information (DCI) for downlink scheduling (i.e., including scheduling information of the PDSCH) on the PDCCH (S1902).

DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled and Single-user (SU)/Multi-user (MU) transmission scheduling is also available.

Further, a TCI field is configured by 3 bits and a maximum of 8 TCI states are indicated according to a TCI field value to dynamically the QCL for the DMRS.

The UE receives downlink data from the eNB on the PDSCH (S1903).

When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter 'dmrs-Type' in the UE and the DMRS type is used for receiving the PDSCH. Further, in the UE, the maximum number of front-loaded DMRS symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

UPlink Transmission/Reception Operation

FIG. 20 is a flowchart showing an example of an uplink transmission/reception operation to which a method proposed in the present disclosure may be applied.

Referring to FIG. 20, the eNB schedules uplink transmission such as the frequency/time resource, the transport layer, an uplink precoder, the MCS, etc., (S2001). In particular, the eNB may determine a beam for PUSCH transmission of the UE through the aforementioned operations.

The UE receives DCI for downlink scheduling (i.e., including scheduling information of the PUSCH) on the PDCCH (S2002).

DCI format 0_0 or 0_1 may be used for the uplink scheduling and in particular, DCI format 0_1 includes the following information: Identifier for DCI formats), UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S2003).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

In 3GPP standard Rel-15, a Physical Uplink Shared Channel (PUSCH) beam indication may be configured through a Sounding Reference Signal (SRS) Resource Indicator (SRI) field of downlink control information for an uplink configuration (UL DCI). In this case, a PUSCH beam indication configuration procedure may be divided into a case where a beam correspondence is not established and a case where the beam correspondence is established. In the case where the beam correspondence is not established, the UE performs a UL beam management operation for a best UL analog beam by using multiple resources in an SRS resource set in which a usage is 'BM' and thereafter, links an SRS resource determined as a best beam to the PUSCH as a result of UL BM according to spatial relation information ('SRS-SpatialRelationInfo') in an SRS resource set in which the usage is 'CB' or 'non-CB', and the eNB performs the PUSCH beam indication through the SRI field.

In the case where the beam correspondence is established, the UL BM operation is omitted and DL RS ID (e.g., CSI-RI/SSB-RI) is configured in the spatial relation information ('SRS-SpatialRelationInfo') of the resource(s) in the SRS resource set in which the usage is 'CB' or 'non-CB', and as a result, the eNB may configure a UL analog beam corresponding to a DL beam through the SRI field. In the present disclosure, a method that may efficiently indicate the PUSCH beam will be described.

More specifically, in the case where the beam correspondence is not established, the UE may expect to perform a UL beam management operation for finding a best UL analog beam by using multiple resources in the SRS resource set in which the usage is 'BM', and thereafter, link the resources determined as the best UL analog beam as the result of the UL BM according to the spatial relation information ('SRS-SpatialRelationInfo') of the resources in the SRS resource set in which the usage is 'CB' or 'non-CB', and transmit the SRS in which the usage is 'CB' or 'non-CB' with the corresponding analog beam, and be indicated with link adaptation and MCS/RI/TPMI from the eNB. Consequently, the resources which belong to the SRS resource set in which the usage is 'CB' or 'non-CB' are configured as candidates of the PUSCH beam indicator through RRC by using one or two SRS resource indicators in the SRI field to indicate the PUSCH beam through the SRI field of the UL DCI for final PUSCH scheduling.

In this case, in order for the resource included in the SRS resource set in which the usage is 'CB' or 'non-CB' configured in the SRI field to be available as the resource for indicating the PUSCH beam, the resource which belongs to the SRS resource set in which the usage is 'CB' or 'non-CB' should be used for transmitting the SRS at least once or more before the indication through the SRI of the UL DCI.

However, in the case where the beam correspondence is not established, when a time domain behavior of the SRS resource set in which the usage is 'CB' or 'non-CB' is periodic or aperiodic, a spatial relation of the resources included in the corresponding SRS resource set cannot but be reconfigured through RRC, and as a result, a more flexible and dynamic analog beam indication is difficult. Meanwhile, when the time domain behavior of the SRS resource set is semi-persistent, the spatial relation of the resources may be reconfigured through an MAC-control element (CE).

In the case where the beam correspondence is established, the UL BM operation is omitted and DL RS ID (e.g., CSI-RI/SSB-RI) is configured in the spatial relation information ('SRS-SpatialRelationInfo') of the resource(s) in the SRS resource set in which the usage is 'CB' or 'non-CB', and as a result, the eNB may configure a UL analog beam corresponding to a DL beam through the SRI field. Even in this case, the resource included in the SRS resource set in which the usage is 'CB' or 'non-CB' should be used for transmitting the SRS at least once or more before the indication through the SRI of the UL DCI.

However, in this case, the UL BM process for finding the best UL analog beam by using the SRS in which the usage is 'BM' is omitted. Such a UL BM process has a purpose for gNB to find and configure the best UL analog beam, and simultaneously, the gNB may determine a UL channel quality in order to indicate the MCS/RI/TPMI, and this is omitted, and as a result, a problem may occur.

In order to solve the problems, in the present disclosure, a more efficient PUSCH beam indication method considering up to dynamic beam indication and UL link adaptation will be described below.

Multi-Beam Enhancements

In 3GPP Rel-16, an identifier (ID) which may be used for indicating panel-specific UL transmission may be supported.

Since there is a reuse/modification capability of a specification in 3GPP Rel-15, a new ID may be introduced, and as a result, the new ID should be defined.

For the panel-specific UL transmission, a capability of the UE may be signaled.

In order to reduce a UL beam management delay in PUCCH spatial relation control, the maximum number of RRC configurable spatial relations for the PUCCH (i.e., maxNrofSpatialRelationInfos) increases to 64 per BWP.

The ID for indicating the panel-specific UL transmission may be i) an SRS resource set ID related to another reference signal (RS), ii) an ID related to an RS resource and/or resource set, iii) an ID which may be allocated to the RS resource and/or resource set, and iv) an ID additionally included in the spatial relation information.

Hereinafter, more specifically, the method for determining the beam used for transmitting the PUSCH will be described.

(Method 1)

When the resource included in the SRS resource set in which the usage is configured as 'CB' or 'non-CB' is not used for transmitting the SRS before the indication through the SRI field of the UL DCI, if the resource is indicated through the SRI field, the UE transmits the PUSCH by using a DL-RS (e.g., CSI-RS, SSB=RI) configured as the spatial relation information ('SRS-SpatialRelationInfo') with the resource or the UL beam of the SRS resource, as a fallback behavior.

In this case, the resource may be a resource configured as an SRI candidate and the eNB may transmit, to the UE, information on the candidate.

Method 1-1: When the RS configured as the spatial relation information ('SRS-SpatialRelationInfo') of the SRS resource is the DL RS, the PUSCH is transmitted by using a beam used when receiving the DL RS most recently from an indication time through the SRI field of the UL DCI.

Specifically, referring to FIG. 21, there are two cases of determining the PUSCH beam by applying Method 1-1 described above.

First, as a general case, the UE transmits the PUSCH at a time t=4 by using the same beam as the beam receiving the CSI-RS having the spatial relation with the SRS resource indicated by SRI field of the UL DCI received at a time t=0. In this case, the CSI-RS is received at a time before receiving the UL DCI. Further, in this case, the SRS is transmitted before transmitting the PUSCH through the SRS resource indicated by the SRI field. In this case, the transmitted SRS may be an SRS for the SB usage.

Next, referring to a fallback case, the UE transmits the PUSCH at the time t=4 by using the same beam as the beam receiving the CSI-RS having the spatial relation with the SRS resource indicated by SRI field of the UL DCI received at the time t=0 in the same manner as the general case. However, in this case, even though the SRS is not transmitted by using the SRS resource, the UE may transmit the PUSCH by using the beam receiving the CSI-RS.

Method 1-2: When the RS configured as the spatial relation information ('SRS-SpatialRelationInfo') of the SRS resource is the SRS resource, the PUSCH is transmitted by using a beam of a reference SRS resource which the UE uses when transmitting the PUSCH to the eNB most recently from the indication time through the SRI field of the UL DCI. In other words, the PUSCH is transmitted by using the beam used for transmitting the SRS which the UE transmits to the eNB most recently.

Specifically, referring to FIG. 21, there are two cases of determining the PUSCH beam by applying Method 1-2 described above.

First, as a general case, the UE may receive the UL DCI at the time t=0, and in this case, the UE may transmit, to the eNB, the PUSCH at the time t=4 by using the same beam as the beam used for the SRS transmission using the SRS resource (SRS") indicated by the SRI field of the DCI.

Specifically, the PUSCH is transmitted by using the SRS resource (SRS") having the spatial relation with a resource (SRS', SRS resource 3) used for transmitting the SRS for the BM usage, which the UE transmits to the eNB before the time t=0. In other words, the SRS is transmitted by using the SRS resource for the CB usage, which has the spatial relation with the SRS resource for the BM usage and the PUSCH is transmitted by using the beam used for the SRS transmission using the SRS resource for the CB usage.

Next, in the fallback case, the UE may receive the UL DCI at the time t=0, and in this case, the UE may transmit the PUSCH at the time t=4 by using a beam related to an SRS resource (SRS') having the spatial relation with the SRS resource (SRS") indicated by the SRI field of the DCI.

In other words, the UE performs the SRS transmission using the SRS resource (SRS') for the BM usage before receiving the UL DCI, and performs the PUSCH transmission by using a beam used in this case.

That is, unlike the general case, even though the SRS for the CB usage is not transmitted, the PUSCH may be transmitted by using the beam used for the SRS transmission using SRS'.

(Method 2)

A PUSCH beam candidate indicated through the SRI field of the UL DCI may include candidates A, B, and C as described below. In this case, the UE determines, as the beam to be used for transmitting the PUSCH, a beam candidate used most recently from an indication time of the PUSCH beam candidate through the SRI field of the UL DCI among three beam candidates A, B, and C, and transmits the PUSCH by using the determined beam.

Meanwhile, by comparing two beam candidates of beam candidates A, B, and C, the beam candidate used most recently from the PUSCH beam candidate indication time of two beam candidates is used for transmitting the PUSCH (e.g., a most recently used beam of beam candidates A and B, a most recently used beam of beam candidates B and C, and a most recently used beam of beam candidates A and C).

Here, "most recently" may become k (k>=0) before the indication time of the PUSCH beam candidate through the SRI field by considering a UL beam weight calculation and setting time. For example, if k is 4 and the beam candidate indication time is n, a beam candidate most recently used during an interval from n−4 to n may be determined as the beam for transmitting the PUSCH.

The PUSCH beam candidate is as follows.

Beam candidate A (Option A): UL beam used for the SRS transmission for the 'CB' or 'non-CB' usage by using the resource included in the SRS resource set in which the usage is 'CB' or 'non-CB', which is transmitted before the time of receiving the SRI field, Beam candidate B (Option B): Beam used for receiving the DL RS (e.g., CSI-RI/SSB-RI) configured as the spatial relation information ('SRS-SpatialRelationInfo') of the resource included in the SRS resource set in which the usage is 'CB' or 'non-CB', which is received or transmitted before the time of receiving the SRI field (similar to the beams in Methods 1-1 and 1-2).

Beam candidate C (Option C): when the resource included in the SRS resource set in which the usage is 'CB' or 'non-CB', which is transmitted before the time of receiving the SRI field is duplicated with the SRS resource set in which the usage is 'BM', UL beam used for the SRS transmission for the 'BM' usage using the duplicated resource Hereinafter, the candidate beams of Method 2 will be described in detail through FIG. 23.

Beam candidate A may be a beam receiving and receiving the SRS resource set before receiving the UL DCI, and used for transmitting the SRS for the CB usage using the SRS resource (SRS") indicated by the SRI field of the DCI included in the SRS resource set, which is used for transmitting the PUSCH. In this case, SRS" may be a resource having the spatial relation with the resource used for receiving the DL RS (CSI-RS).

Beam candidate B may be divided into two cases, B-1 and B-2, and first, in the case of B-1, the UE receives the DL RS (CSI-RS), and transmits the SRS by using the SRS resource (SRS") for the CB usage, which has the spatial relation with the resource sued for receiving the CSI-RS. Thereafter, the UE receives a new DL RS (CSI-RS), and in this case, the used beam may be different from a beam used for previously receiving the DL RS, i.e., the beam used for transmitting the SRS. In this case, the beam which the UE uses for receiving the new DL RS may be B-1, and the UE may transmit the PUSCH by using beam B-1. In this case, the resource used for transmitting the new DL RS has the spatial relation with the resource used for transmitting the SRS. Further, in this case, the SRS resource indicated by the UL DCI is SRS".

In the case of B-2, the UE transmits the SRS by using any one of the SRS resources for the BM usage before receiving the UL DCI, and transmit the SRS for the CB usage by using the beam used at this time. The resource (SRS") used for transmitting the SRS for the CB usage has the spatial relation with SRS'. Thereafter, the UE may perform new beam management, and transmit the SRS for the BM usage by using the resource (resource 3, SRS'). In this case, since the new beam management is performed, resource 3 before performing the beam management and resource 3 after performing the beam management may be different resources. In this case, the resource after performing the beam management has the spatial relation with SRS". In this case, the UE may transmit the PUSCH by using the beam used for transmitting the SRS after performing the beam management, and the beam in this case may be B-2.

In respect to beam candidate C, when there are overlapped resources in the SRS resource set for the BM usage which the UE receives before receiving the UL DCI and the SRS resource set for the CB usage, the SRS for the BM usage is transmitted by using the overlapped resources, and in this case, the used beam may become beam candidate C. Beam candidate C is similar to beam candidate B, but beam candidate C is slightly different from beam candidate B in that beam candidate C is related to the overlapped resources in the SRS resource set for the BM usage and the SRS resource set for the CB usage.

(Method 3)

In order to replace the SRI field of the UL DCI used for the existing PUSCH beam indication or in the case of using a UL TCI field (to apply the reception beam corresponding to the DL RS to the UL beam, and directly use the reception beam) in addition to the SRI field, PUSCH beam candidates indicated by the SRI field and/or a transmission configuration indicator (TCI) field may include beam candidates A, B, and C as described below. In this case, the UE determines, as the beam to be used for transmitting the PUSCH, a beam candidate used most recently from the time of receiving the SRI field of the UL DCI and/or the TCI field among three beam candidates A, B, and C, and transmits the PUSCH by using the determined beam.

Meanwhile, by comparing two beam candidates of beam candidates A, B, and C, the beam candidate used most recently from the time of receiving the SRI field of the UL DCI and/or the TCI field is used for transmitting the PUSCH (e.g., a most recently used beam of beam candidates A and B, a most recently used beam of beam candidates B and C, and a most recently used beam of beam candidates A and C).

Here, "most recently" may become k (k>=0) before the indication time of the PUSCH beam candidate through the SRI field by considering a UL beam weight calculation and setting time. For example, if k is 4 and the beam candidate indication time is n, a beam candidate most recently used during an interval from n−4 to n may be determined as the beam for transmitting the PUSCH.

Here, the UL TCI field may be basically used for obtaining a reference of a "QCL-Type D" component of the TCI state from the DL RS and in addition, QCL-Type components may be obtained from the DL RS indicated by the UL TCI field. For example, the UL TCI is differently indicated for each panel by using QCL-Type other than 'QCL-Type D", and as a result, more efficient UL transmission is enabled by applying time information or Doppler series information differently for each UL panel.

Beam candidate A: When the beam candidate is indicated by the SRI field, UL beam used for the SRS transmission for the 'CB' or 'non-CB' usage by using the resource included in the SRS resource set in which the usage is 'CB' or 'non-CB', which is transmitted before the time of receiving the SRI field, When the bean candidate is indicated by the TCI field, beam used when receiving the DL RS indicated by the TCI field, Beam candidate B: beam used for receiving the DL RS (e.g., CSI-RI/SSB-RI) configured as the spatial relation information ('SRS-SpatialRelationInfo') of the resource included in the SRS resource set in which the usage is 'CB' or 'non-CB', which is received or transmitted before the time of receiving the SRI field, when the beam candidate is indicated by the SRI field (similar to the beams in Methods 1-1 and 1-2).

When the beam candidate is indicated by the TCI field, beam received for the DL RS of the DL TCI state which the DL RS indicated by the TCI field determines as the reference, Beam candidate C: when the resource included in the SRS resource set in which the usage is 'CB' or 'non-CB', which is transmitted before the time of receiving the SRI field is duplicated with the SRS resource set in which the usage is 'BM', UL beam used for the SRS transmission for the 'BM' usage using the duplicated resource.

(Method 4)

Method 4 relates to a method for determining the panel of the UE for transmitting the PUSCH beam indicated by the SRI field of the UL DCI and/or the UL TCI field. The UE may determine/recognize the panel for transmitting the PUSCH based on methods to be described below.

Method 4-1

When DL RSs (e.g., CSI-RI-SSB-RI) configured as the spatial relation information ('SRS-SpatialRelationInfo') with the SRS resource indicated through the SRI field of the UL DCI or indicated through the UL TCI field are linked to the panel(s) of each UE, the UE transmits the PUSCH by using the UL beam indicated through the corresponding panel(s). Specifically, the UE may be configured/indicated to receive a specific DL RS from the eNB by using a specific panel(s)/beam(s) of the UE panels, and the configuration/indication may be configured/indicated together with the RRC configuration of the DL RS. Further, in the case of an aperiodic DL RS, a DL RS reception panel/beam may be indicated by interlocking with an independent bit field of the DL DCI or an existing bit field such as the CSI request/TCI state, and a reception panel/beam of the PDSCH is indicated and the UE may receive the DL RS or the PDSCH by using the indicated panel/beam. Thereafter, a relation between the DL RS and the UE reception panel/beam configured once may be updated through the MAC CE, etc. It may be configured that the SRS resource and the panel are linked as the spatial relation information ('SRS-SpatialRelationInfo') of the SRS resource(s) indicated by the SRI field based on the relation of the DL RS and the UE reception panel or the UE determined that the DL RSs (e.g., CSI-RI/SSB-RI) configured as the UL TCI state are linked to each panel(s) of the UE, and as result, the UE regards that the panel(s) and UL beam connected to the corresponding DL RS are indicated and transmits the PUSCH by using the corresponding panel(s) and beam(s) when transmitting the PUSCH by the SRI field or the TCI field.

Method 4-2

For the DL RS (e.g., CSI-RI/SSB-RI) configured as the spatial relation information ('SRS-SpatialRelationInfo') of the SRS resource indicated by the SRI field of the UL DCI or indicated by the UL TCI field, after an initial connection DL RS is configured, the UE that receives the corresponding RS may report, to the eNB, a panel(s) receiving the DL RS at the time of feedback. Specifically, reportQuantity of CSI reporting setting may include 'cri-RI-PMI-CQI', 'cri-RI-LI-PMI-CQI', 'cri-RI-i1', 'cri-RI-CQI', 'cri-RI-i1-CQI', 'cri-RSRP', 'ssb-Index-RSRP', etc., and since 'cri-RI-CQI-pid' or 'cri-RSRP-pid' added with 'pid' ('panel-id') is further included in the reportQuantity, which is transmitted, the UE is capable of performing CSI reporting for the RS received by the panel(s) of the corresponding pid. In this case, the UE may implicitly assume that a linkage between the corresponding reception panel(s) and the DL RS is formed. If the DL RS is configured and indicated as the spatial relation information ('SRS-SpatialRelationInfo') of the SRS resource(s) in the SRI field or as the UL TCI state, the UE may transmit the PUSCH by using the beam(s) indicated through the panel(s) having the linkage with the DL RS similar to Method 4-1. In respect to the linkage between the DL RS and the UE panel(s), the UE that receives the corresponding DL RS may report 'pid' receiving the DL RS as the reportQuantity at the time of the CSI reporting and in this case, the linkage between the DL RS and the UE panel(s) may be updated. In this case, there may be one or more pids.

Method 4-3

As information on the UE panel in the SRS resource, "a linkage with the DL RS" or "panel ID information" may be configured through RRC and exist as information elements (IEs). When the spatial relation information ('SRS-SpatialRelationInfo') of the resource(s) included in the SRS resource set(s) in which the usage is 'CB' or 'non-CB' is configured as another SRS resource through this, the UE may transmit the SRS to the corresponding panel based on the "linkage with the DL RS" or the "panel ID information" configured as described above by using the SRS resource(s) transmitted for the corresponding usage of 'CB' or 'non-CB'. Thereafter, similarly even when the corresponding SRS resource(s) is indicated as the PUSCH beam by the SRI field of the UL DCI, the UE transmits the PUSCH by using the corresponding panel based on the "linkage with the DL RS" or the "panel ID information" configured as described above. As information on the UE panel in the SRS resource, the "linkage with the DL RS" or the "panel ID information" may be updated through MAC CE for flexible configuration.

(Method 5)

Methods 1 to 4 described above may be applied even to applying the PUCCH.

In the legacy 3GPP Rel-15, the PUCCH beam is determined by RRC configuration 'PUCCH-SpatialRelationInfo'. RSs which may be configured as 'PUCCH-SpatialRelationInfo' of the PUCCH beam include the DL RS (e.g., CSI-RI/SSB-RI) and the SRS resource like the beam of the SRS. If the RS configured as 'PUCCH-SpatialRelationInfo' is the DL RS (e.g., CSI-RI/SSB-RI), the UE may transmit the PUCCH beam by using the panel(s) having the linkage with the configured DL RS like Methods 4-1 and 4-2. Meanwhile, if the RS configured as 'PUCCH-SpatialRelationInfo' is the SRS resource, the UE may transmit the PUCCH beam through the corresponding panel(s) based on the "linkage with the DL RS" or the "Panel ID information" as the information on the UE panel configured in the SRS resource like Method 4-3. In addition, with respect to a validity of the DL RS or the SRS configured as 'PUCCH-SpatialRelationInfo', a UL beam which is most recently configured or generated may be used as the PUCCH beam like Method 2 or 3.

When Methods 1 to 5 described above are used, there are the following effects.

In the case of Method 1, in a current 3GPP standard, the resource included in the SRS resource set for the 'CB' or 'non-CB' usage should be used for transmission at least once or more before receiving the UL DCI including the SRI field. However, when Method 1 is used, there is an effect that the PUSCH beam may be determined even though the resource included in the SRS resource set is not used for transmission. Further, when the SRI candidate of the UL DCI is updated through RRC and before the resource of the corresponding SRI is used for the SRS transmission, the resource of the corresponding SRS resource is configured as the PUSCH beam, Method 1 may be applied, and as a result, there is an effect of reducing overhead and reducing the delay.

When Method 2 is used, the UL beam of the beam candidate most recently used before receiving the SRI field of the UL DCI among the beam candidates may be determined as the PUSCH beam, and as a result, there is an effect that the delay may be reduced and the UL beam is more flexibly determined.

Beam candidate A may be a PUSCH beam determining method of the legacy 3GPP Rel-15 and beam candidate B may be a PUSCH beam determining method of Method 1. In the case of beam candidate C, since an SRS resource(s) having one global ID may be configured to coexist with the SRS resource set(s) in which the usage is 'BM' and the SRS resource set(s) in which the usage is 'CB' or 'non-CB', if the corresponding SRS resource(s) is transmitted before the indication through the SRI field of the UL DCI regardless of the 'BM' usage or the 'CB'/'non-CB' usage, the corresponding SRS resource(s) is valid as the SRI candidate. Therefore, it is possible to more flexibly indicate the PUSCH beam and it is possible to indicate the PUSCH beam regardless of the 'BM' usage or the 'CB'/'non-CB' usage, and as a result, there is effect that it is efficient even in terms of UL link adaptation.

In the case of Method 3, when the UL TCI state for more directly connecting the DL RS to the PUSCH beam determination is supported, the beam of the beam candidate most recently used before indication through the SRI field of the UL DCI and/or indication through the UL TCI field among respective options is determined as the PUSCH beam, and as a result, there is an effect that the delay may be reduced and the UL beam may be more flexibly determined.

In the case of Method 4-1, in a case where the UE receives a specific panel(s)/beam(s) when the eNB transmits the DL RS, the corresponding reception panel(s)/beam(s) is allowed to be used even for the PUSCH transmission, and as a result, there is an effect that complexity may be reduced in the UL transmission.

In the case of Method 4-2, in a case where the UE receives a specific panel(s)/beam(s) when the eNB transmits the DL RS, the UE also reports the information on the panel(s) jointly, and as a result, the corresponding reception panel(s)/beam(s) is allowed to be sued for the PUSCH transmission, and as a result, there is an effect that complexity may be reduced in the UL transmission.

In the case of Method 4-3, the SRS resource(s) in which 'SRS-SpatialRelationInfo' is the SRS resource is configured in the SRS resource set for the 'CB' or 'non-CB' usage, and the "linkage with the DL RS" or the "panel ID information" is configured through RRC as the information on the UE panel in the SRS resource configured as 'SRS-SpatialRelationInfo', and the corresponding panel(s) is thus configured to be used even for the PUSCH transmission, and as a result, there is an effect that the complexity may be reduced in the UL transmission.

Since Method 5 is a method that is applied to both the cases where the DL RS and the SRS resource are configured as 'PUCCH-SpatialRelationInfo' to configure/indicate the panel(s) to transmit the PUCCH beam, by using a 'PUCCH-SpatialRelationInfo' format which exists as the legacy method for configuring/indicating the PUCCH beam, there is an effect that even backward compatibility may be considered.

After the UE/eNB transmits/receives data (PUSCH) by performing the above-described method/operation, the UE/eNB waits until next data is generated by switching to a DRX mode according to the following proposed operation when transmitting/receiving all data.

Discontinuous Reception (DRX) Operation

Discontinuous Reception (DRX) means an operation mode of allowing the UE to reduce battery consumption so as for the UE to discontinuously receive a downlink channel. In other words, a UE in which the DRX is configured discontinuously receives a DL signal to reduce power consumption. A DRX operation is performed in a DRX cycle representing a time interval in which On Duration is periodically repeated and the DRX cycle includes the On Duration and a slip interval (alternatively, Opportunity for DRX). The On Duration represents a time interval which the UE monitors in order to receive the PDCCH. The DRX may be performed in a Radio Resource Control (RRC)_IDLE state (or mode), an RRC_INACTIVE state (or mode), and an RRC_CONNECTED state (or mode). In the RRC_IDLE state and the RRC_INACTIVE state, the DRX is used for discontinuously receiving a paging signal.

- RRC_Idle state: State in which a wireless connection (RRC connection) is not configured between the eNB and the UE.
- RRC Inactive state: State in which the wireless connection (RRC connection) is configured between the eNB and the UE, but the wireless connection is inactivated.
- RRC_Connected state: State in which the wireless connection (RRC connection) is configured between the eNB and the UE.

The DRX is generally divided into Idle mode DRX, Connected DRX(C-DRX), and extended DRX, and DRX applied in the IDLE state is referred to as Idle mode DRX and DRX applied in the CONNECTED state is referred to as Connected mode DRX (C-DRX).

Extended/enhanced DRX (eDRX) as a mechanism capable of extending cycles of Idle mode DRX and C-DRX may be primarily used for application of (massive) IoT. Whether the eDRX is permitted in the Idle mode DRX may be configured by system information (e.g., SIB1). The SIB1 may include an eDRX-Allowed parameter and the eDRX-Allowed parameter is a parameter representing whether Idle mode extended DRX is permitted.

Idle Mode DRX

In the Idle mode, the UE may use the DRX in order to reduce the power consumption. One paging occasion (PO) is a subframe in which Paging-Radio Network Temporary Identifier (P-RNTI) may be transmitted on PDCCH, MPDCCH, or NPDCCH of addressing a paging message for NB-IoT. In the P-RNTI transmitted on the MPDCCH, the PO represents a start subframe of MPDCCH repetition. In the case of the P-RNTI transmitted on the NPDCCH, the PO indicates a start subframe of NPDCCH repetition when a subframe determined by the PO is not a valid NB-IoT downlink subframe. Then, a first valid NB-IoT downlink subframe after the PO is a start subframe of NPDCCH repetition.

One paging frame (PF) is one radio frame which may include one or multiple paging occasions. When the DRX is used, the UE needs to monitor only one PO per DRX cycle. One paging narrowband (PNB) is one narrowband in which the UE receives the paging message. The PF, the PO, and the PNB may be determined based on the DRX parameters provided in the system information.

FIG. 24 is a flowchart showing an example of a method for performing an Idle mode DRX operation.

The UE receives Idle mode DRX configuration information from the eNB through higher layer signaling (e.g., system information)) (S2410).

In addition, the UE determines a Paging Frame (PF) for monitoring a physical downlink control channel (e.g., PDCCH) in a DRX cycle and a Paging Occasion (PO) in the PF based on the Idle mode DRX configuration information (S2420). Here, the DRX cycle includes On duration and a sleep interval (alternatively, Opportunity for DRX).

In addition, the UE monitors the PDCCH in the PO of the determined PF (S2430). The UE monitors only one subframe (PO) per paging DRX cycle.

Additionally, when the UE receives a PDCCH scrambled by P-RNTI for On duration (i.e., when detecting paging), the UE transitions to a connected mode to transmit and receive data to and from the eNB.

FIG. 25 is a diagram illustrating an example of an Idle mode DRX operation.

Referring to FIG. 25, when traffic destined for a UE in an RRC_Idle state (hereinafter, referred to as an 'Idle state') occurs, paging occurs to the corresponding UE. The UE wakes up periodically, i.e., every (paging) DRX cycle and monitors the PDCCH. When there is the paging, the UE transitions to a Connected state and receives data and when there is no paging, the UE enters a sleep mode again.

Connected Mode DRX (C-DRX)

C-DRX may be DRX applied in an RRC Connected state and a DRX cycle of the C-DRX may be constituted by a Short DRX cycle and/or a Long DRX cycle. The Short DRX cycle is optional. When the C-DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring PDCCH, the UE enters a sleep state after the On Duration ends. When the C-DRX is configured, a PDCCH reception occasion (e.g., a slot having a PDCCH search space) may be discontinuously configured according to the C-DRX configuration. On the contrary, when the C-DRX is not configured, the PDCCH reception occasion (e.g., the slot having the PDCCH search space) may be continuously configured. Meanwhile, regardless of whether the C-DRX is configured, PDCCH monitoring may be limited in a time interval configured as a measurement gap.

FIG. 26 is a flowchart showing an example of a method for performing a C-DRX operation.

The UE receives from the eNB RRC signaling (e.g., MAC-MainConfig IE) including DRX configuration information (S2610). The DRX configuration information may include the following information.

- onDurationTimer: The number of PDCCH subframes to be continuously monitored a start part of the DRX cycle drx-InactivityTimer: The number of PDCCH subframes to be continuously monitored when the UE decodes PDCCH having scheduling information drx-RetransmissionTimer: The number of PDCCH subframes to be continuously monitored when HARQ retransmission is predicted longDRX-Cycle: On Duration occurrence cycle drxStartOffset: Subframe number in which the DRX cycle starts drxShortCycleTimer: The number of times of short DRX cycle shortDRX-Cycle: DRX cycle which operates at the number of times of drxShortCycleTimer when Drx-InactivityTimer is terminated In addition, when DRX 'ON' is configured through a DRX command of MAC command element (CE) (S2620), the UE monitors the PDCCH for ON duration of the DRX cycle based on the DRX configuration (S2630).

FIG. 27 is a diagram illustrating an example of a C-DRX operation.

Referring to FIG. 27, when the UE receives scheduling information (e.g., DL Grant) in an RRC_Connected state (hereinafter, referred to as a Connected state), the UE drives a DRX inactivity timer and an RRC inactivity timer.

When the DRX inactivity timer expires, a DRX mode starts and the UE wakes up at the DRX cycle and monitors the PDCCH for a predetermined time (on duration timer). Here, when Short DRX is configured, the UE starts with a short DRX cycle when starting the DRX mode and when the short DRX cycle ends, the UE enters a long DRX cycle. The long DRX cycle is a multiple of the short DRX cycle and the UE wakes up more frequently in the short DRX cycle. When the RRC inactivity timer expires, the UE transitions to the Idle state and performs the Idle mode DRX operation.

IA/RA+DRX Operation

FIG. 28 is a diagram illustrating an example of power consumption depending on a state of a UE.

Referring to FIG. 28, after power on, the UE performs Boot Up for application loading, an initial access/random access procedure for synchronizing downlink and uplink with the eNB, a registration procedure with the network, etc., and current (or power consumption) consumed while performing each procedure is illustrated in FIG. 28. When the transmission power of the UE is high, current consumption of the UE increases. In addition, when there is no traffic transmitted to the UE or to be transmitted to the eNB, the UE transitions to the Idle mode and performs the Idle mode DRX operation. In addition, when paging (e.g., call occurrence) occurs during the Idle mode DRX operation, the UE transitions to the Connected mode to the Idle mode through a cell establishment procedure and transmits and receives data to and from the eNB. In addition, when there is no data which the UE transmits and receives to and from the eNB in the connected mode for a specific time or at a configured time, the UE performs the connected DRX (C-DRX) operation.

In addition, when the extended DRX (eDRX) is configured through the higher layer signaling (e.g., system information), the UE may perform the eDRX operation in the Idle mode or Connected mode.

Each embodiment or each method described above may be performed separately, and is performed by a combination of one or more embodiments or methods to implement the method proposed in the present disclosure.

FIG. 29 is a flowchart showing an operation process in a UE transmitting a physical uplink shared channel according to an embodiment of the present disclosure.

First, the UE receives, from eNB, information on a plurality of beam candidates for transmitting the PUSCH through a Sounding Reference Signal Resource Indicator (SRI) field or a Transmission Configuration Indicator (TCI) field (S2910).

The UE determines any one beam of the plurality of beam candidates based on a predefined reference (S2920).

The UE transmit the PUSCH by the determined any one beam (S2930).

In this case, the any one beam determined based on the predefined reference may be a beam most recently used by the UE within a specific interval among the plurality of beam candidates.

The method may further include: before step S2910, receiving, from the base station, a first sounding reference signal (SRS) resource set having a codebook or non-codebook purpose; and receiving, from the base station, a second SRS resource set for a beam management purpose.

In addition, when the information on the plurality of beam candidates is transmitted through the SRI field, the plurality of beam candidates may be i) a beam used for the UE to transmit, to the base station, the SRS using a first resource of the first SRS resource set, ii) a beam used for the UE to transmit, to the base station, a reference signal (RS) having a spatial relation with a second resource of the first SRS resource set indicated by the SRI field, and iii) a beam used for transmitting the SRS using a third resource when the third resource of the first SRS resource set indicated by the SRI field is included in the second SRS resource set, before a time of receiving the DCI.

Meanwhile, when the information on the plurality of beam candidates is transmitted through the TCI field, the plurality of beam candidates may be i) a beam used for the UE to receive, form the base station, the downlink reference signal and ii) a beam used for transmitting the reference signal indicated by the TCI state related to the downlink reference signal indicated by the TCI field, before the time of receiving the DCI.

In this case, the specific interval may be from a time earlier than the time of receiving the DCI by k slots up to the time of receiving the DCI.

The PUSCH may be transmitted on a specific panel, and in this case, the specific panel is a panel having a linkage to the any one beam determined based on the predefined reference, and the linkage is transmitted from the base station through an MAC control element (CE).

Referring to FIGS. 31 to 34, a UE transmitting a physical uplink shared channel (PUSCH) in a wireless communication system propose din the present disclosure will be described.

In this case, the UE may be configured to include: one or more transceivers; one or more processors; and one or more memories storing instructions for operations executed by the one or more processors and connected to the one or more processors.

In this case, the operations executed by the one or more processors may be the same as the operations related to FIG. 29.

FIG. 30 is a flowchart showing an example of an operation method of an eNB performing a method for receiving a Physical Uplink Shared Channel (PUSCH) in a wireless communication system proposed in the present disclosure.

First, the eNB receives, from a UE, information on a plurality of beam candidates for transmitting the PUSCH through a Sounding Reference Signal Resource Indicator (SRI) field or a Transmission Configuration Indicator (TCI) field (S3010).

The eNB receives, from the UE, the PUSCH transmitted by using any one beam determined based on a predefined reference among the plurality of beam candidates (S3020).

In this case, the any one beam determined based on the predefined reference may be a beam most recently used by the UE within a specific interval among the plurality of beam candidates.

Referring to FIGS. 31 to 34, an eNB receiving a physical uplink shared channel (PUSCH) in a wireless communication system propose din the present disclosure will be described.

In this case, the eNB may be configured to include: one or more transceivers; one or more processors; and one or more memories storing instructions for operations executed by the one or more processors and connected to the one or more processors.

In this case, the operations executed by the one or more processors may be the same as the operations related to FIG. 30.

The UE/eNB described in the present disclosure may be replaced with various devices and applied as illustrated in FIGS. 31 and 34.

For example, the operations of the UE/eNB which transmits/receives the PUSCH may be implemented by devices in FIGS. 31 to 34 to be described below. For example, referring to FIG. 32, one or more processors 3212 and 3222 may control one or more memories 3216 and 3226 and/or one or more transceivers 3216 and 3226 so as to receive related information and one or more transceivers 3216 and 3226 may transmit the related information.

The operations related to the method for transmitting/receiving the PUSCH by the UE/eNB may be implemented by the devices (e.g., FIGS. 31 to 34) to be described below. For example, the operations related to the method for transmitting/receiving the PUSCH may be processed by one or more processors 3212 and 3222 in FIGS. 31 to 34 and the operations related to the method for transmitting/receiving the PUSCH may be stored in memories 3214 and 3224 in the form of an instruction/program (e.g., instruction or executable code) for driving at least one processor in FIGS. 31 to 34.

For example, a device includes: one or more memories and one or more processors functionally connected to the one or more memories, in which the one or more processors may control the device to receive, from a base station, information on a plurality of beam candidates for transmitting the PUSCH through a Sounding Reference Signal Resource Indicator (SRI) field or a Transmission Configuration Indicator (TCI) field, determine any one beam of the plurality of beam candidates based on a predefined reference, and transmit the PUSCH by the determined any one beam, and the any one beam determined based on the predefined reference may be configured to be a beam most recently used by the UE within a specific interval among the plurality of beam candidates.

As another example, in one or more non-transitory computer-readable media (CRM) storing one or more instructions, the one or more instructions executable by one or more processors may include instructions for instructing a user equipment (UE) to receive, from a base station, information on a plurality of beam candidates for transmitting the PUSCH through a Sounding Reference Signal Resource Indicator (SRI) field or a Transmission Configuration Indicator (TCI) field, determine any one beam of the plurality of beam candidates based on a predefined reference, and transmit the PUSCH by the determined any one beam, and the any one beam determined based on the predefined reference may be a beam most recently used by the UE within a specific interval among the plurality of beam candidates.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., LTE, 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 31 illustrates a communication system 10000 applied to the present disclosure.

Referring to FIG. 31, a communication system 10000 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 10000a, vehicles 10000b-1 and 10000b-2, an eXtended Reality (XR) device 10000c, a hand-held device 10000d, a home appliance 10000e, an Internet of Things (IoT) device 10000f, and an Artificial Intelligence (AI) device/server 40000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 20000a may operate as a BS/network node with respect to other wireless devices.

The wireless devices 10000a to 10000f may be connected to the network 30000 via the BSs 20000. An AI technology may be applied to the wireless devices 10000a to 10000f and the wireless devices 10000a to 10000f may be connected to the AI server 40000 via the network 30000. The network 30000 may be configured using a 3G network, a 4G (e.g., LTE) network, or a 5G (e.g., NR) network. Although the wireless devices 10000a to 10000f may communicate with each other through the BSs 20000/network 30000, the wireless devices 10000a to 10000f may perform direct communication (e.g., sidelink communication) with each other without passing through the BSs/network. For example, the vehicles 10000b-1 and 10000b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 10000a to 10000f.

Wireless communication/connections 15000a, 15000b, or 15000c may be established between the wireless devices 10000a to 10000f/BS 20000, or BS 20000/BS 20000. Herein, the wireless communication/connections may be established through various RATs (e.g., 5G NR) such as uplink/downlink communication 15000a, sidelink communication 15000b (or, D2D communication), or inter BS communication (e.g. relay, Integrated Access Backhaul (IAB)). The wireless devices and the BSs/the wireless devices may transmit/receive radio signals to/from each other through the wireless communication/connections 15000a and 15000b. For example, the wireless communication/connections 15000a and 15000b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 32 illustrates wireless devices applicable to the present disclosure.

Referring to FIG. 32, a first wireless device 3210 and a second wireless device 3220 may transmit radio signals through a variety of RATs (e.g., LTE and NR). Herein, {the first wireless device 3210 and the second wireless device 3220} may correspond to {the wireless device 10000x and the BS 20000} and/or {the wireless device 10000x and the wireless device 10000x} of FIG. 31.

The first wireless device 3210 may include one or more processors 3212 and one or more memories 3214 and additionally further include one or more transceivers 3216 and/or one or more antennas 3218. The processor(s) 3212 may control the memory(s) 3214 and/or the transceiver(s) 3216 and may be configured to implement the descriptions, functions, procedures, proposals, methods, and/or operational flowcharts disclosed in this document. For example, the processor(s) 3212 may process information within the memory(s) 3214 to generate first information/signals and then transmit radio signals including the first information/signals through the transceiver(s) 3216. The processor(s) 3212 may receive radio signals including second information/signals through the transceiver 3216 and then store information obtained by processing the second information/signals in the memory(s) 3214. The memory(s) 3214 may be connected to the processor(s) 3212 and may store a variety of information related to operations of the processor(s) 3212. For example, the memory(s) 3214 may store software code including commands for performing a part or the entirety of processes controlled by the processor(s) 3212 or for performing the descriptions, functions, procedures, proposals, methods, and/or operational flowcharts disclosed in this document. Herein, the processor(s) 3212 and the memory(s) 3214 may be a part of a communication modem/circuit/chip designed to implement RAT (e.g., LTE or NR). The transceiver(s) 3216 may be connected to the processor(s) 3212 and transmit and/or receive radio signals through one or more antennas 3218. Each of the transceiver(s) 3216 may include a transmitter and/or a receiver. The transceiver(s) 3216 may be interchangeably used with Radio Frequency (RF) unit(s). In the present disclosure, the wireless device may represent a communication modem/circuit/chip.

The second wireless device 3220 may include one or more processors 3222 and one or more memories 3224 and additionally further include one or more transceivers 3226 and/or one or more antennas 3228. The processor(s) 3222 may control the memory(s) 3224 and/or the transceiver(s) 3226 and may be configured to implement the descriptions, functions, procedures, proposals, methods, and/or operational flowcharts disclosed in this document. For example, the processor(s) 3222 may process information within the memory(s) 3224 to generate third information/signals and then transmit radio signals including the third information/signals through the transceiver(s) 3226. The processor(s) 3222 may receive radio signals including fourth information/signals through the transceiver(s) 3226 and then store information obtained by processing the fourth information/signals in the memory(s) 3224. The memory(s) 3224 may be connected to the processor(s) 3222 and may store a variety of information related to operations of the processor(s) 3222. For example, the memory(s) 3224 may store software code including commands for performing a part or the entirety of processes controlled by the processor(s) 3222 or for performing the descriptions, functions, procedures, proposals, methods, and/or operational flowcharts disclosed in this document. Herein, the processor(s) 3222 and the memory(s) 3224 may be a part of a communication modem/circuit/chip designed to implement RAT (e.g., LTE or NR). The transceiver(s) 3226 may be connected to the processor(s) 3222 and transmit and/or receive radio signals through one or more antennas 3228. Each of the transceiver(s) 3226 may include a transmitter and/or a receiver. The transceiver(s) 3226 may be interchangeably used with RF unit(s). In the present disclosure, the wireless device may represent a communication modem/circuit/chip.

Hereinafter, hardware elements of the wireless devices 3210 and 3220 will be described more specifically. One or more protocol layers may be implemented by, without being limited to, one or more processors 3212 and 3222. For example, the one or more processors 3212 and 3222 may implement one or more layers (e.g., functional layers such as PHY, MAC, RLC, PDCP, RRC, and SDAP). The one or more processors 3212 and 3222 may generate one or more Protocol Data Units (PDUs) and/or one or more Service Data Unit (SDUs) according to the descriptions, functions, procedures, proposals, methods, and/or operational flowcharts disclosed in this document. The one or more processors 3212 and 3222 may generate messages, control information, data, or information according to the descriptions, functions, procedures, proposals, methods, and/or operational flowcharts disclosed in this document. The one or more processors 3212 and 3222 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 3216 and 3226. The one or more processors 3212 and 3222 may receive the signals (e.g., baseband signals) from the one or more transceivers 3216 and 3226 and acquire the PDUs, SDUs, messages, control information, data, or information according to the descriptions, functions, procedures, proposals, methods, and/or operational flowcharts disclosed in this document.

The one or more processors 3212 and 3222 may be referred to as controllers, microcontrollers, microprocessors, or microcomputers. The one or more processors 3212 and 3222 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 3212 and 3222. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 3212 and 3222 or stored in the one or more memories 3214 and 3224 so as to be driven by the one or more processors 3212 and 3222. The descriptions, functions, procedures, proposals, methods, and/or operational flowcharts disclosed in this document may be implemented using firmware or software in the form of code, commands, and/or a set of commands.

The one or more memories 3214 and 3224 may be connected to the one or more processors 3212 and 3222 and store various types of data, signals, messages, information, programs, code, instructions, and/or commands. The one or more memories 3214 and 3224 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 3214 and 3224 may be located at the interior and/or exterior of the one or more processors 3212 and 3222. The one or more memories 3214 and 3224 may be connected to the one or more processors 3212 and 3222 through various technologies such as wired or wireless connection.

The one or more transceivers 3216 and 3226 may transmit user data, control information, and/or radio signals/channels, mentioned in the methods and/or operational flowcharts of this document, to one or more other devices. The one or more transceivers 3216 and 3226 may receive user data, control information, and/or radio signals/channels, mentioned in the descriptions, functions, procedures, proposals, methods, and/or operational flowcharts disclosed in this document, from one or more other devices. For example, the one or more transceivers 3216 and 3226 may be connected to the one or more processors 3212 and 3222 and transmit and receive radio signals. For example, the one or more processors 3212 and 3222 may perform control so that the one or more transceivers 3216 and 3226 may transmit user data, control information, or radio signals to one or more other devices. The one or more processors 3212 and 3222 may perform control so that the one or more transceivers 3216 and 3226 may receive user data, control information, or radio signals from one or more other devices. The one or more transceivers 3216 and 3226 may be connected to the one or more antennas 3218 and 3228 and the one or more transceivers 3216 and 3226 may be configured to transmit and receive user data, control information, and/or radio signals/channels, mentioned in the descriptions, functions, procedures, proposals, methods, and/or operational flowcharts disclosed in this document, through the one or more antennas 3218 and 3228. In this document, the one or more antennas may be a plurality of physical antennas or a plurality of logical antennas (e.g., antenna ports). The one or more transceivers 3216 and 3226 may convert received radio signals/channels etc. from RF band signals into baseband signals in order to process received user data, control information, radio signals/channels, etc. using the one or more processors 3212 and 3222. The one or more transceivers 3216 and 3226 may convert the user data, control information, radio signals/channels, etc. processed using the one or more processors 3212 and 3222 from the base band signals into the RF band signals. To this end, the one or more transceivers 3216 and 3226 may include (analog) oscillators and/or filters.

Utilization Example of Wireless Device to which Present Disclosure is Applied

FIG. 33 illustrates another example of a wireless device applied to the present disclosure. The wireless device may be implemented as various types according to a use example/service (see FIG. 31).

Referring to FIG. 33, wireless devices 3100 and 3200 may correspond to the wireless devices 3210. 3220 and 6200 of FIG. 32 and may be constituted by various elements, components, units, and/or modules. For example, the wireless devices 3100 and 3200 may include a communication unit 3310, a control unit 3320, and a memory unit 3330, and an additional element 3340. The communication unit may include a communication circuit 3312 and a transceiver(s) 3314. For example, the communication circuit 3312 may include one or more processors 3212 and 3222 and/or one or more memories 3214 and 3224 of FIG. 32. For example, the transceiver(s) 3314 may include one or more transceivers 3216 and 3226 and/or one or more antennas 3218 and 3228 of FIG. 32. The control unit 3320 is electrically connected to the communication unit 3310, the memory unit 3330, and the additional element 3340 and controls an overall operation of the wireless device. For example, the control unit 3320 may an electrical/mechanical operation of the wireless device based on a program/code/instruction/information stored in the memory unit 3330. Furthermore, the control unit 3320 may transmit the information stored in the memory unit 3330 to the outside (e.g., other communication devices) through the communication unit 3310 via a wireless/wired interface or store, in the memory unit 3330, information received from the outside (e.g., other communication devices) through the wireless/wired interface through the communication unit 3310.

The additional element 3340 may be variously configured according to the type of wireless device. For example, the additional element 3340 may include at least one of a power unit/battery, an input/output (I/O) unit, a driving unit, and a computing unit. Although not limited thereto, the wireless device may be implemented as a form such as the robot 10000a of FIG. 31, the vehicles 10000b-1 and 10000b-2 of FIG. 31, the XR device 10000c of FIG. 31, the hand-held device 10000d of FIG. 31, the home appliance 10000e of FIG. 31, the IoT device 10000f of FIG. 31, a digital broadcasting terminal, a hologram device, a public safety device, an MTC device, a medical device, a fintech device (or financial device), a security device, a climate/environment device, an AI server/device 40000 of FIG. 31, the base station 20000 of FIG. 31, a network node, etc. The wireless device may be movable or may be used at a fixed place according to a use example/service.

In FIG. 33, all of various elements, components, units, and/or modules in the wireless devices 3100 and 3200 may be interconnected through the wired interface or at least may be wirelessly connected through the communication unit 3310. For example, the control unit 3320 and the communication unit 3310 in the wireless devices 3210 and 3220 may be wiredly connected and the control unit 3320 and the first unit (e.g., 3330 or 3340) may be wirelessly connected through the communication unit 3310. Further, each element, component, unit, and/or module in the wireless devices 3210 and 3220 may further include one or more elements. For example, the control unit 3320 may be constituted by one or more processor sets. For example, the control unit 3320 may be configured a set of a communication control processor, an application processor, an electronic control unit (ECU), a graphic processing processor, a memory control processor, etc. As another example, the memory unit 3330 may be configured as a random access memory (RAM), a dynamic RAM (DRAM), a read only memory (ROM), a flash memory, a volatile memory, a non-volatile memory, and/or combinations thereof.

Example of XR Device to which Present Disclosure is Applied

FIG. 34 illustrates an XR device applied to the present disclosure. The XR device may be implemented as an HMD, a head-up display (HUD) provided in the vehicle, a television, a smartphone, a computer, a wearable device, a home appliance device, a digital signage, a vehicle, a robot, etc.

Referring to FIG. 34, an XR device 10000c may include a communication unit 3310, a control unit 3320, a memory unit 3330, an input/output unit 3340a, a sensor unit 3340b, and a power supply unit 3340c. Here, the blocks 3310 to 3330/3340a to 3340c correspond to the blocks 3310 to 3310 to 3330/3340 of FIG. 33, respectively.

The communication unit 3310 may transmit/receive a signal (e.g., media data, a control signal, etc.) to/from external devices such as other wireless devices, hand-held devices, or media servers. The media data may include a video, an image, a sound, etc. The control unit 3320 may perform various operations by controlling components of the XR device 10000c. For example, the control unit 3320 may be configured to control and/or perform procedures such as video/image acquisition, (video/image) encoding, metadata generation and processing, etc. The memory unit 3330 may store data/parameters/programs/codes/instructions required for driving the XR device 10000c/generating the XR object. The input/output unit 3,340a may output control information, data, etc., from the outside and output the generated XR object. The input/output unit 3340a may include a camera, a microphone, a user input unit, a display unit, a speaker, and/or a haptic module. The sensor unit 3340b may obtain an XR device state, surrounding environmental information, user information, etc. The sensor unit 3340b may include a proximity sensor, an illuminance sensor, an acceleration sensor, a magnetic sensor, a gyro sensor, an inertia sensor, an RGB sensor, an IR sensor, a fingerprint sensor, an ultrasonic sensor, an optical sensor, a microphone, and/or a radar. The power supply unit 3340c may supply power to the XR device 10000c and include a wired/wireless charging circuit, a battery, and the like.

As an example, the memory unit 3330 of the XR device 10000c may include information (e.g., data) required for generating the XR object (e.g., AR/VR/MR object). The input/output unit 3340a may acquire a command for operating the XR device 10000c from the user and the control unit 3320 may drive the XR device 10000c according to a driving command of the user. For example, when the user intends to watch a movie, news, etc., through the XR device 10000c, the control unit 3320 may transmit contents request information to another device (e.g., hand-held device 10000d) or the media server through the communication unit 3330. The communication unit 3330 may download/stream contents such as the movie, the news, etc., to the memory unit 3330, from another device (e.g., hand-held device 10000d) or the media server. The control unit 3320 may perform control and/or perform the procedures such as video/image acquisition, (video/image) encoding, metadata generation/processing, etc., for contents and generate/output the XR object based on a surrounding space or a reality object acquired through the input/output unit 3340a/the sensor unit 3340b.

Further, the XR device 10000c may be wirelessly connected to the hand-held device 10000d through the communication unit 3310 and the operation of the XR device 10000c may be controlled by the hand-held device 10000d. For example, the hand-held device 10000d may operate as a controller for the XR device 10000c. To this end, the XR device 10000c may acquire 3D positional information of the hand-held device 10000d and then generate and output the XR object corresponding to the hand-held device 10000d.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The present disclosure is described based on an example applied to the 3GPP LTE/LTE-A/NR system, but the present disclosure may be applied to various wireless communication systems in addition to the 3GPP LTE/LTE-A/NR system.

What is claimed is:

1. A method for transmitting a Physical Uplink Shared Channel (PUSCH) in a wireless communication system, which is performed by a user equipment (UE), the method comprising:
receiving, from a base station, a first sounding reference signal (SRS) resource set having a codebook or non-codebook purpose;
receiving, from the base station, a second SRS resource set for a beam management purpose;
receiving, from the base station, information on a plurality of beam candidates for transmitting the PUSCH through a Sounding Reference Signal Resource Indicator (SRI) field;
determining any one beam of the plurality of beam candidates based on a predefined reference; and
transmitting the PUSCH by the determined any one beam,
wherein the any one beam determined based on the predefined reference is a beam most recently used by the UE within a specific interval among the plurality of beam candidates, and
wherein the plurality of beam candidates include: i) a beam used for transmitting the SRS using a first resource of the first SRS resource set indicated by the SRI field based on the first resource being included in the second SRS resource set, before a time point of receiving downlink control information (DCI).

2. The method of claim 1, wherein the plurality of beam candidates further include:
ii) a beam used for the UE to transmit, to the base station, the SRS using a second resource of the first SRS resource set,
iii) a beam used for the UE to transmit, to the base station, a reference signal (RS) having a spatial relation with a third resource of the first SRS resource set indicated by the SRI field.

3. The method of claim 1, wherein the specific interval is from a time point earlier than the time point of receiving the DCI by k slots up to the time of receiving the DCI.

4. The method of claim 1, wherein the PUSCH is transmitted on a specific panel.

5. The method of claim 4, wherein the specific panel is a panel having a linkage to the any one beam determined based on the predefined reference.

6. The method of claim 5, wherein the linkage is transmitted from the base station through an MAC control element (CE).

7. A UE for transmitting a Physical Uplink Shared Channel (PUSCH) in a wireless communication system, the UE comprising:
   one or more transceivers;
   one or more processors; and
   one or more memories storing instructions for operations executed by the one or more processors and connected to the one or more processors,
   wherein the operations include:
   receiving, from a base station, a first sounding reference signal (SRS) resource set having a codebook or non-codebook purpose;
   receiving, from the base station, a second SRS resource set for a beam management purpose;
   receiving, from the base station, information on a plurality of beam candidates for transmitting the PUSCH through a Sounding Reference Signal Resource Indicator (SRI) field;
   determining any one beam of the plurality of beam candidates based on a predefined reference; and
   transmitting the PUSCH by the determined any one beam, and
   wherein the any one beam determined based on the predefined reference is a beam most recently used by the UE within a specific interval among the plurality of beam candidates, and
   wherein the plurality of beam candidates include: i) a beam used for transmitting the SRS using a first resource of the first SRS resource set indicated by the SRI field based on the first resource being included in the second SRS resource set, before a time point of receiving downlink control information (DCI).

8. The UE of claim 7, wherein the plurality of beam candidates further include:
   ii) a beam used for the UE to transmit, to the base station, the SRS using a second resource of the first SRS resource set,
   iii) a beam used for the UE to transmit, to the base station, a reference signal (RS) having a spatial relation with a third resource of the first SRS resource set indicated by the SRI field.

9. A method for receiving a Physical Uplink Shared Channel (PUSCH) in a wireless communication system, which is performed by a base station, the method comprising:
   transmitting, to a user equipment (UE), a first sounding reference signal (SRS) resource set having a codebook or non-codebook purpose;
   transmitting, to the UE, a second SRS resource set for a beam management purpose;
   transmitting, to the UE, information on a plurality of beam candidates for transmitting the PUSCH through a Sounding Reference Signal Resource Indicator (SRI) field; and
   receiving, from the UE, the PUSCH transmitted by suing any one beam determined based on a predefined reference among the plurality of beam candidates,
   wherein the any one beam determined based on the predefined reference is a beam most recently used by the UE within a specific interval among the plurality of beam candidates, and
   wherein the plurality of beam candidates include: i) a beam used for transmitting the SRS using a first resource of the first SRS resource set indicated by the SRI field based on the first resource being included in the second SRS resource set, before a time point of receiving downlink control information (DCI).

10. The method of claim 9, wherein the plurality of beam candidates further include:
    ii) a beam used for the UE to transmit, to the base station, the SRS using a second resource of the first SRS resource set,
    iii) a beam used for the UE to transmit, to the base station, a reference signal (RS) having a spatial relation with a third resource of the first SRS resource set indicated by the SRI field.

11. The method of claim 9, wherein the specific interval is from a time point earlier than the time point of receiving the DCI by k slots up to the time of receiving the DCI.

12. The method of claim 9, wherein the PUSCH is transmitted on a specific panel.

13. The method of claim 12, wherein the specific panel is a panel having a linkage to the any one beam determined based on the predefined reference.

14. The method of claim 13, wherein the linkage is transmitted from the base station through an MAC control element (CE).

* * * * *